Sept. 20, 1971     A. GOLDHOFER     3,606,044
LOADING AND UNLOADING APPARATUS FOR BULKY LOADS
Filed April 14, 1969     22 Sheets-Sheet 1
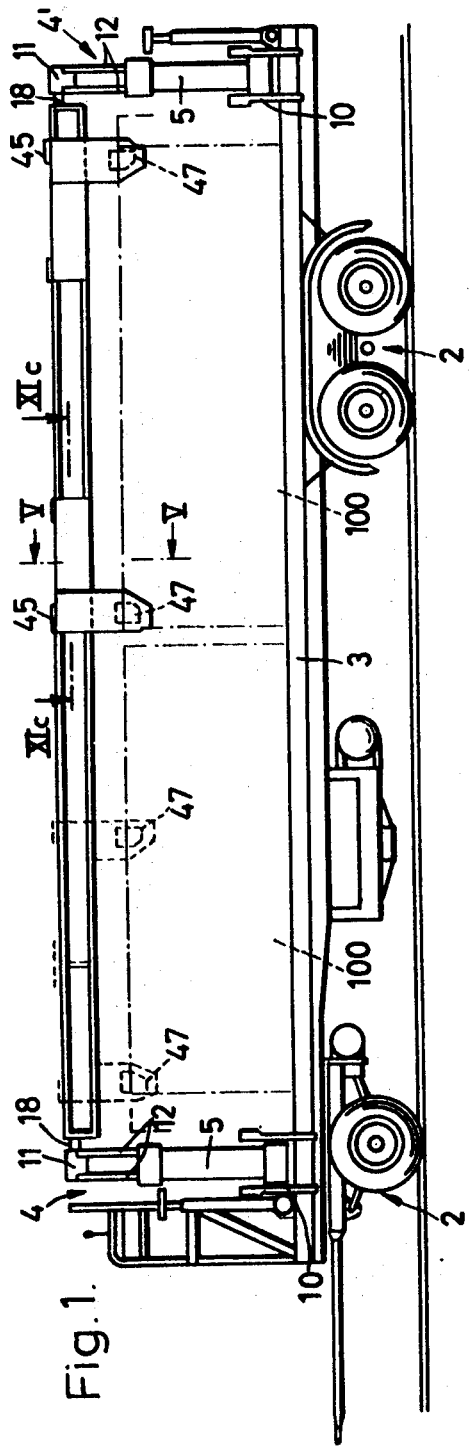
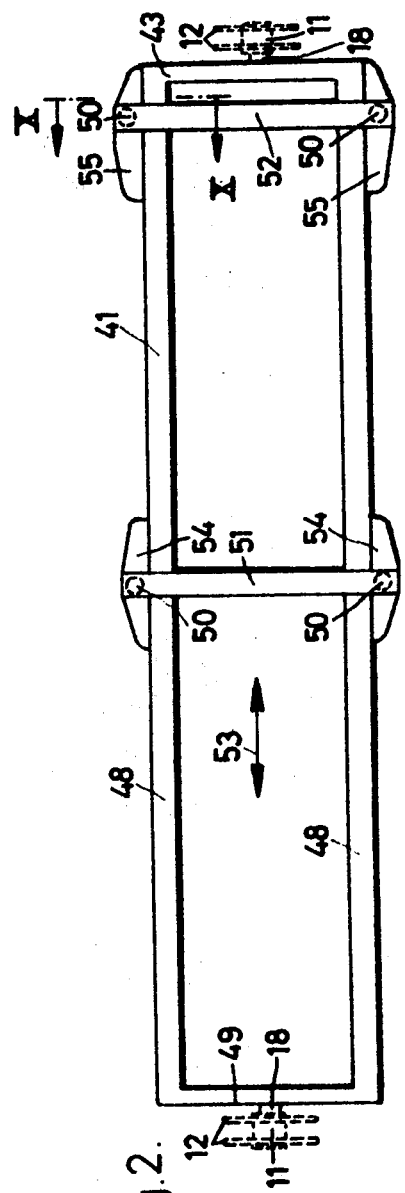
INVENTOR:
ALOIS GOLDHOFER
By
Sherman Levy     Attorney

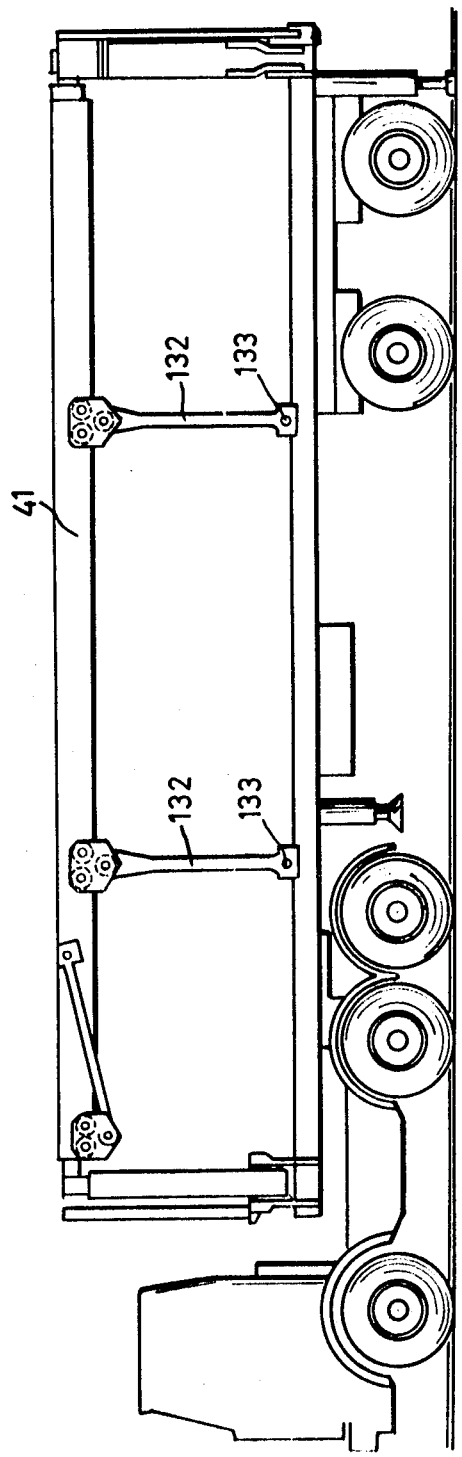

INVENTOR:
ALOIS GOLDHOFER

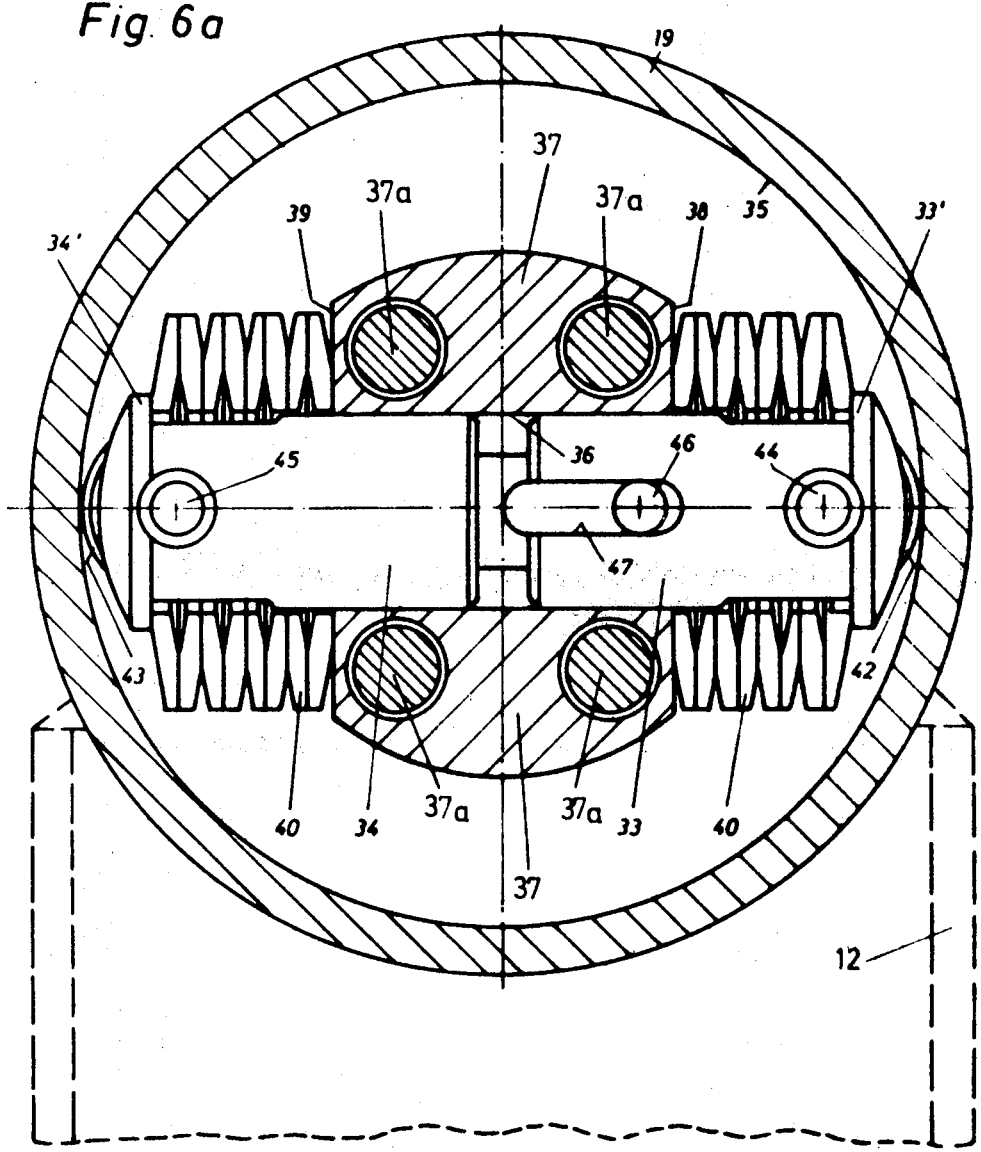

Sept. 20, 1971    A. GOLDHOFER    3,606,044
LOADING AND UNLOADING APPARATUS FOR BULKY LOADS
Filed April 14, 1969    22 Sheets-Sheet 6

ALOIS GOLDHOFER INVENTOR

Sherman Levy ATTORNEY

Sept. 20, 1971  A. GOLDHOFER  3,606,044
LOADING AND UNLOADING APPARATUS FOR BULKY LOADS
Filed April 14, 1969  22 Sheets-Sheet 7

ALOIS GOLDHOFER INVENTOR

Sherman Levy ATTORNEY

Sept. 20, 1971  A. GOLDHOFER  3,606,044
LOADING AND UNLOADING APPARATUS FOR BULKY LOADS
Filed April 14, 1969  22 Sheets-Sheet 8
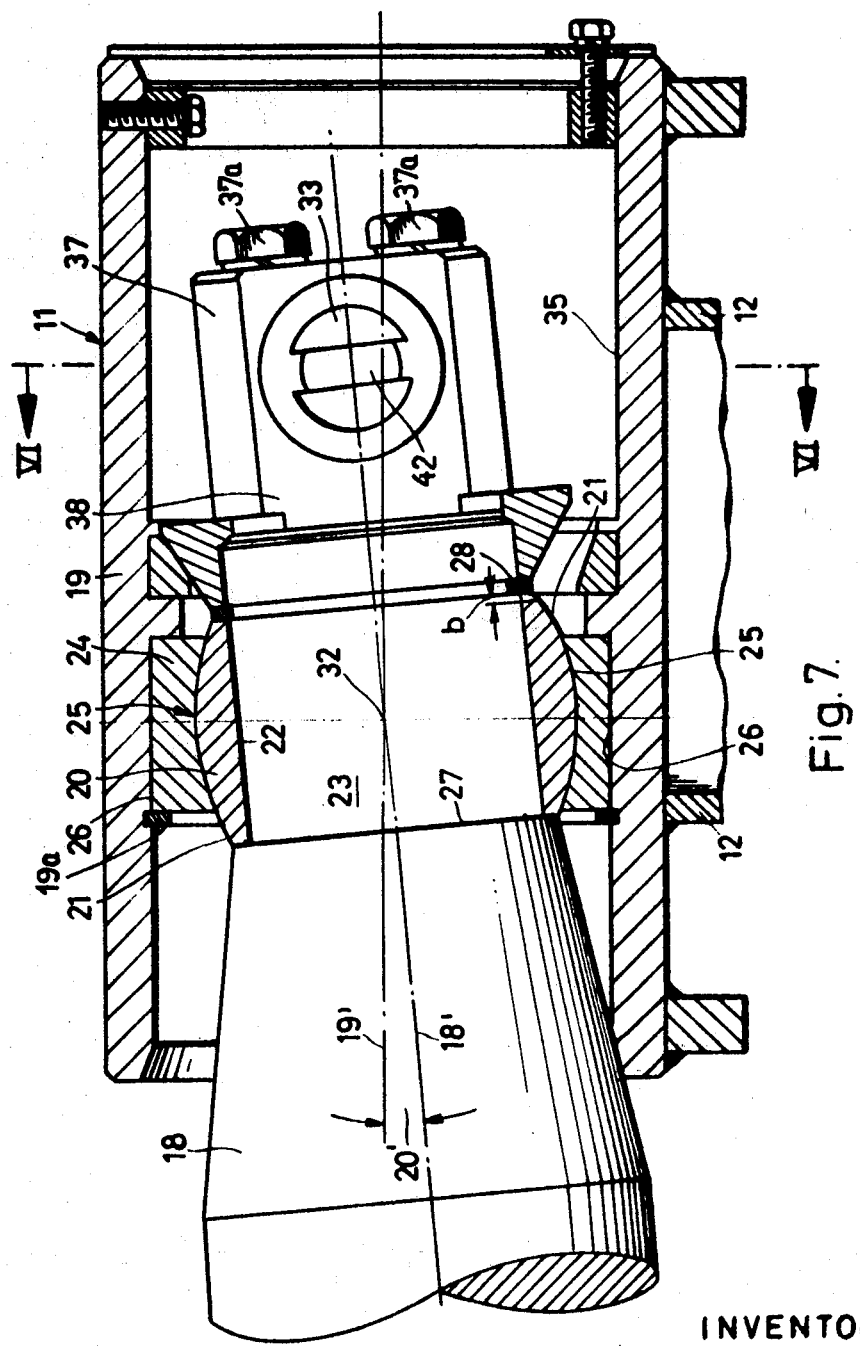
INVENTOR:
ALOIS GOLDHOFER
By
Sherman Lang  Attorney

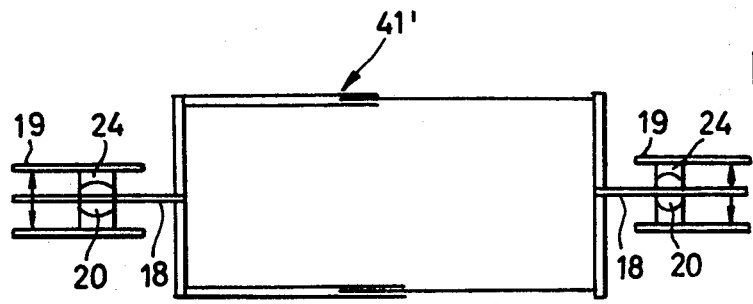
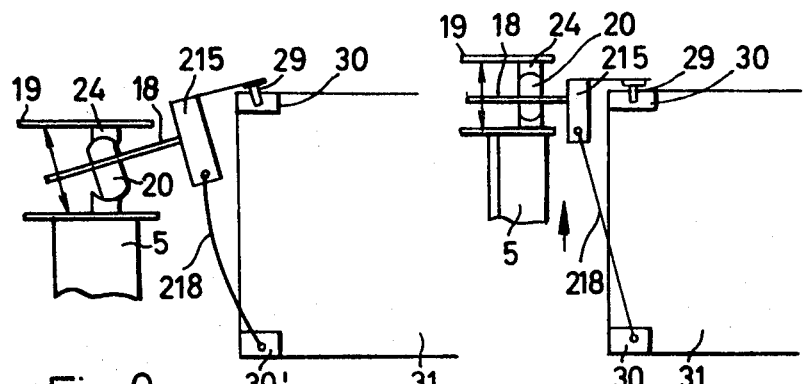
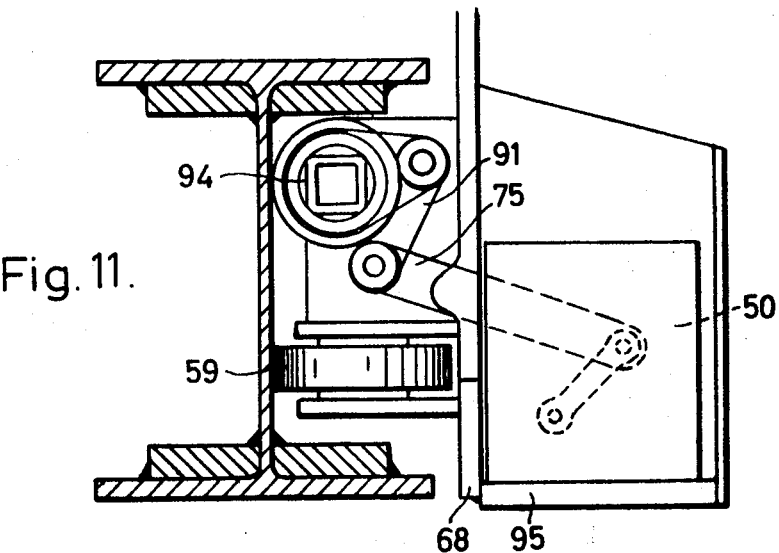

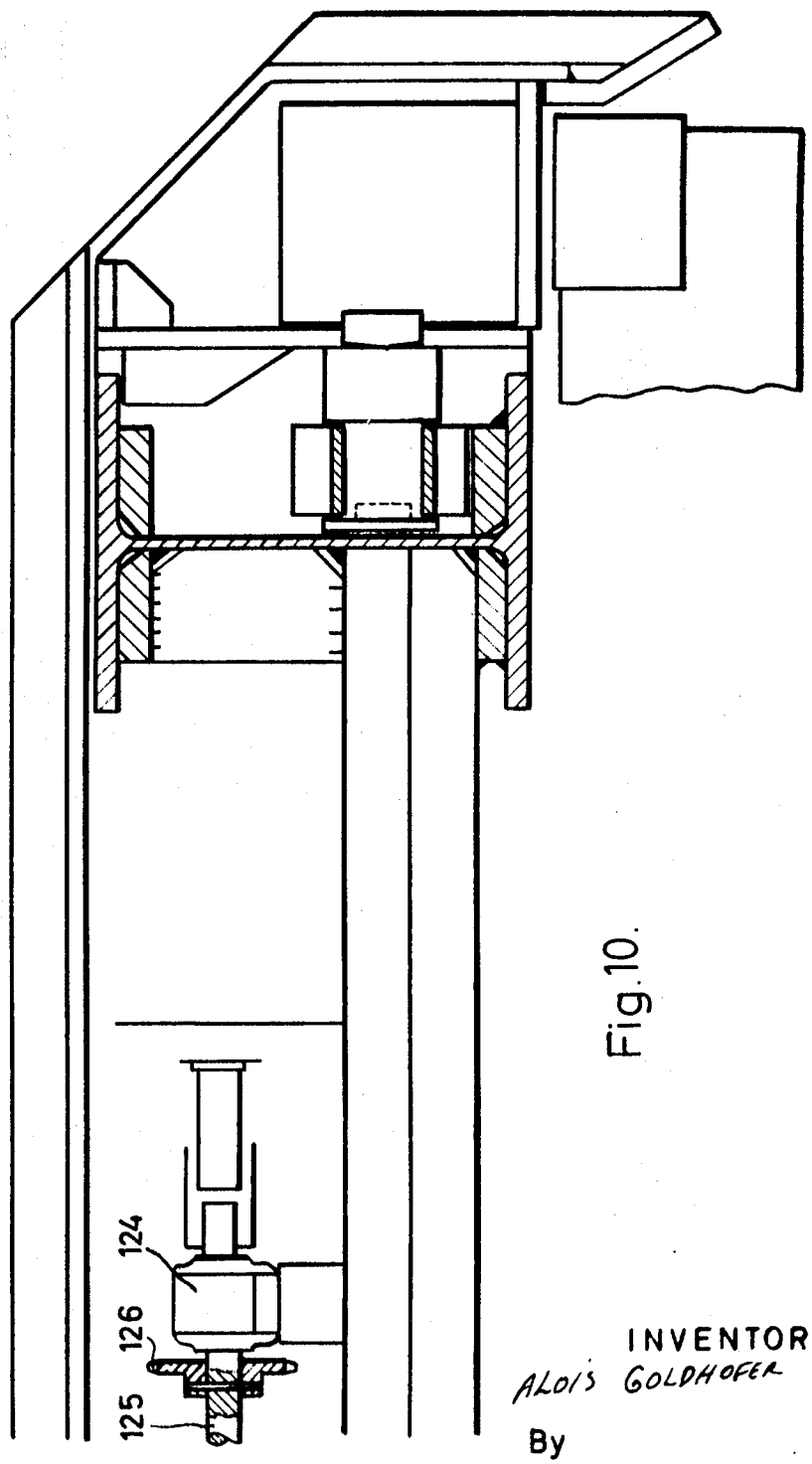

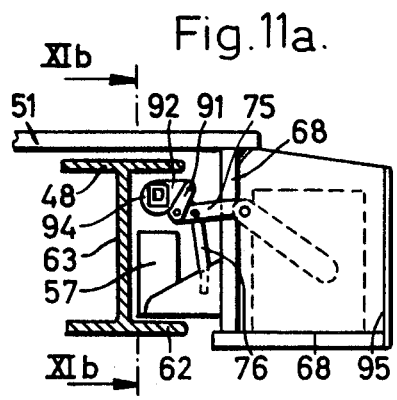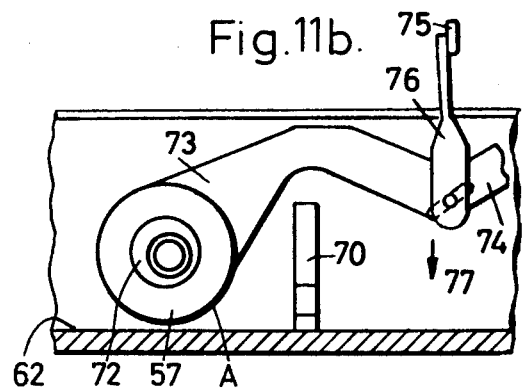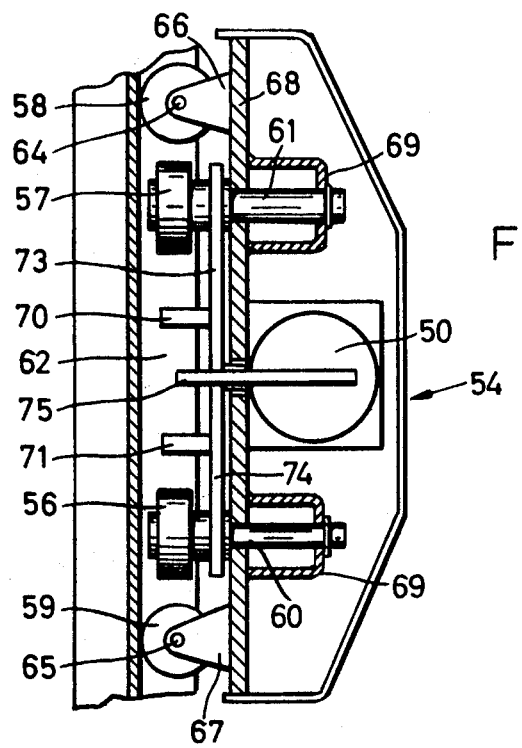

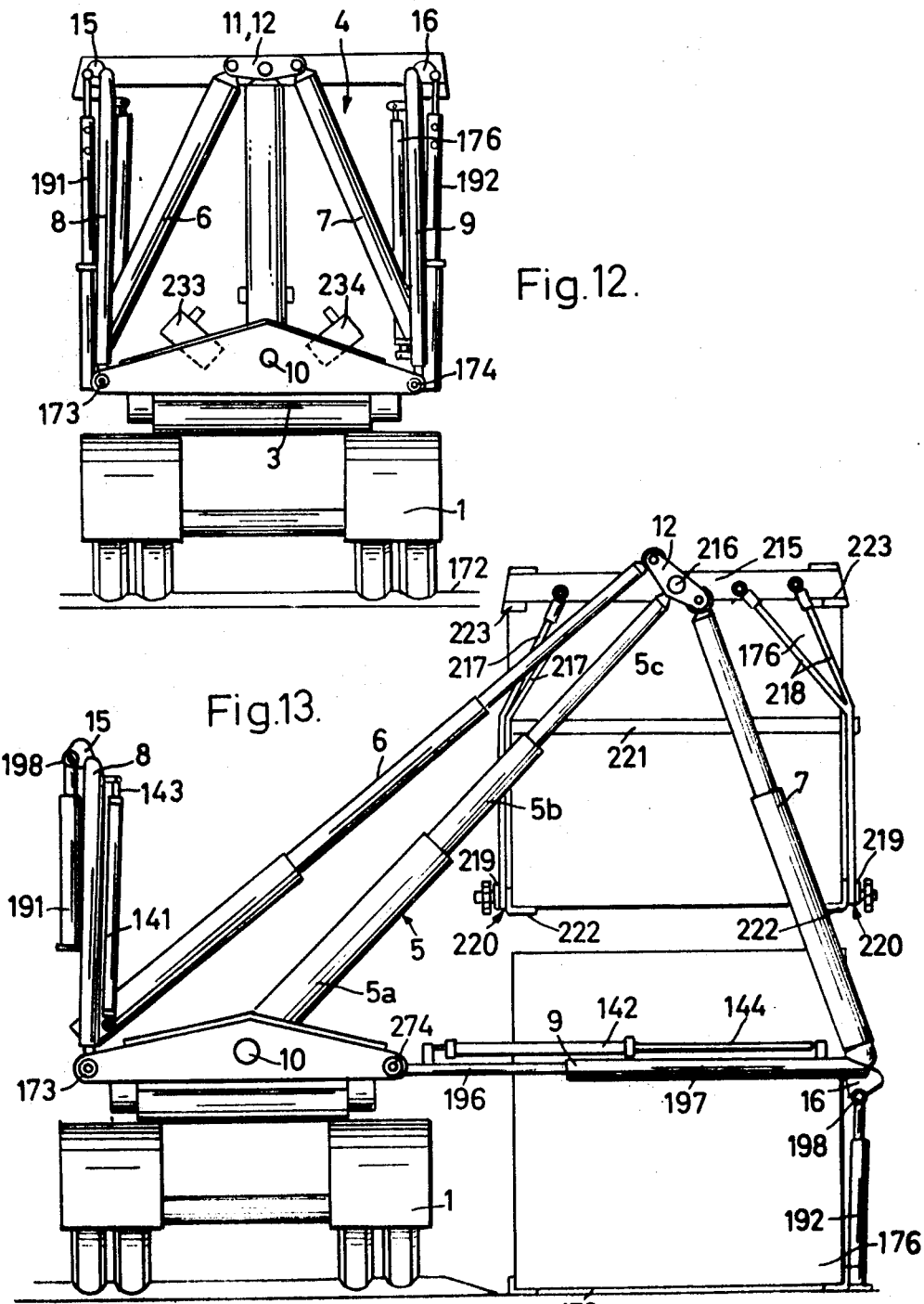

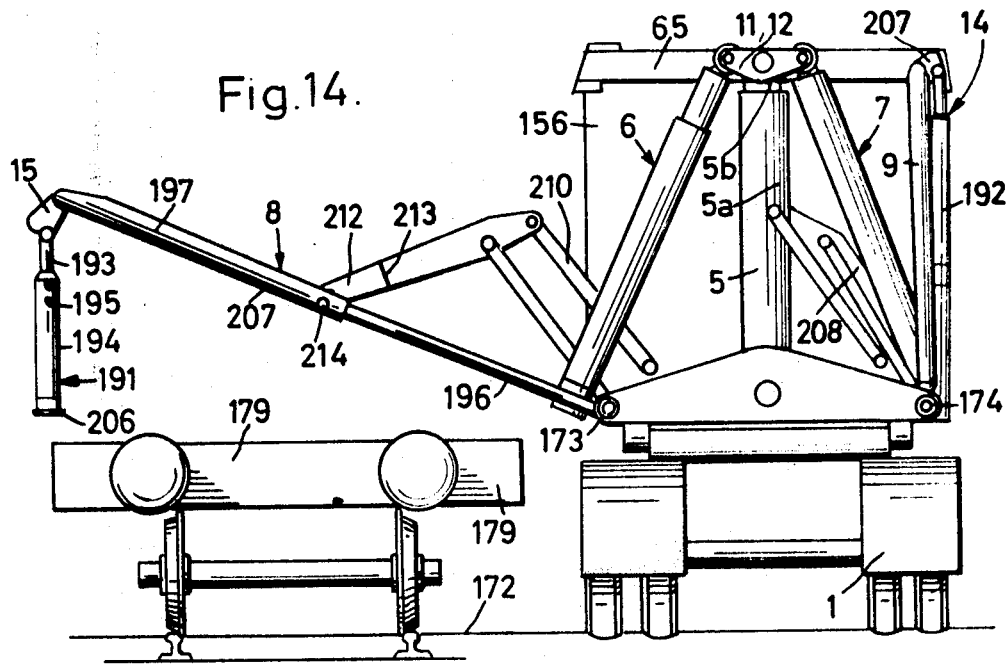
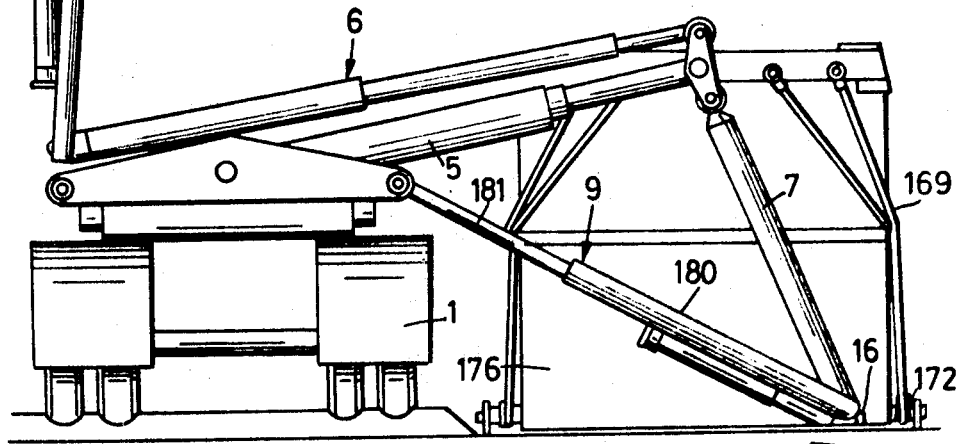

Sept. 20, 1971  A. GOLDHOFER  3,606,044
LOADING AND UNLOADING APPARATUS FOR BULKY LOADS
Filed April 14, 1969  22 Sheets-Sheet 14
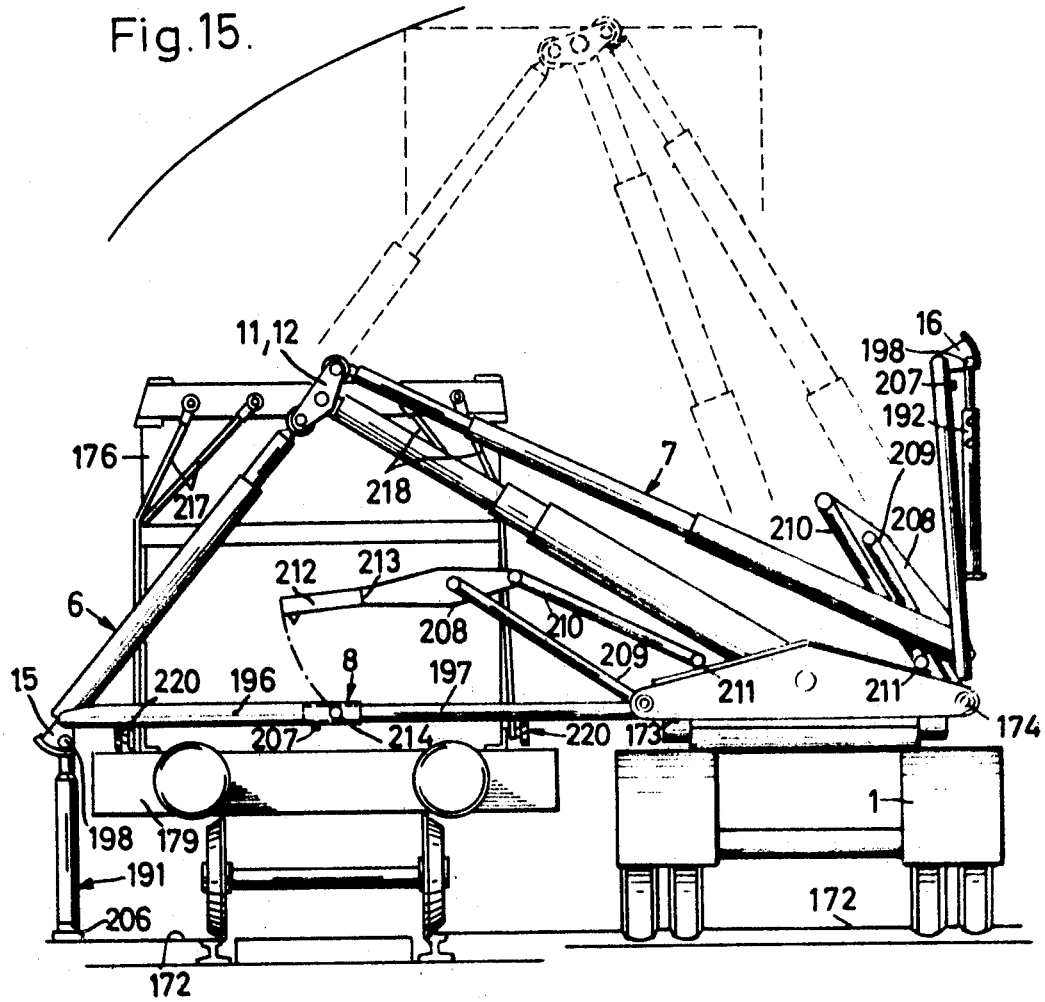
INVENTOR:
ALOIS GOLDHOFER
By
Sherman Levy  Attorney Sept. 20, 1971  A. GOLDHOFER  3,606,044
LOADING AND UNLOADING APPARATUS FOR BULKY LOADS
Filed April 14, 1969  22 Sheets-Sheet 15
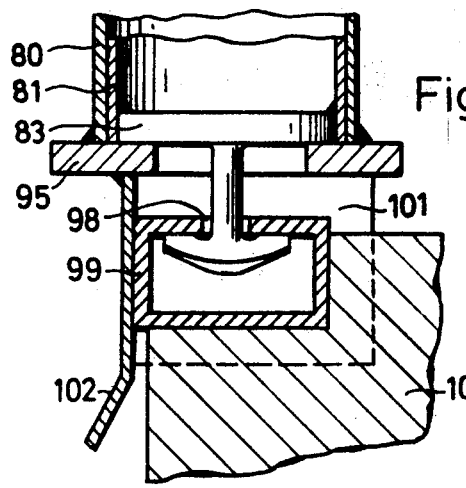
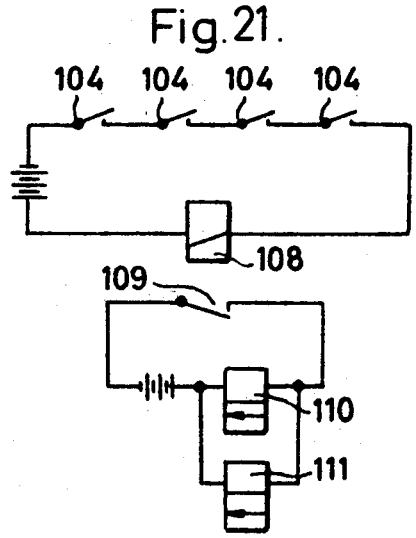
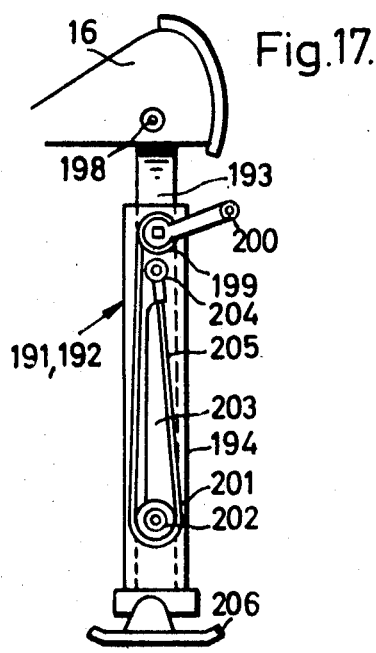
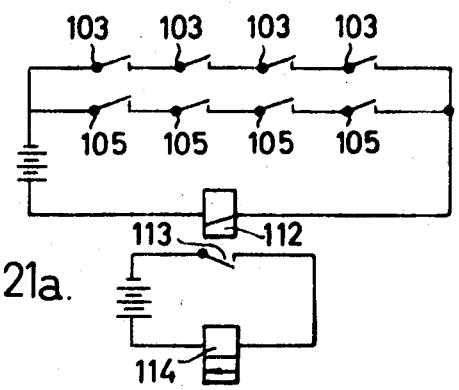
INVENTOR:
ALOIS GOLDHOFER
By
*Sherman Levy*  Attorney

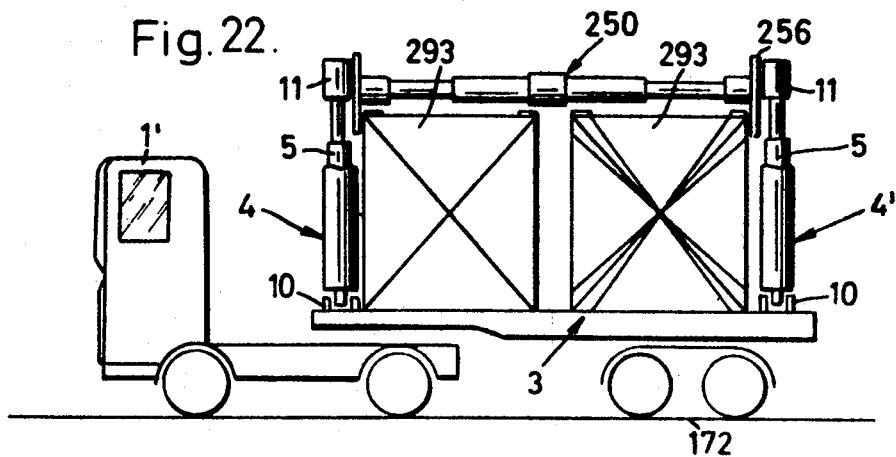
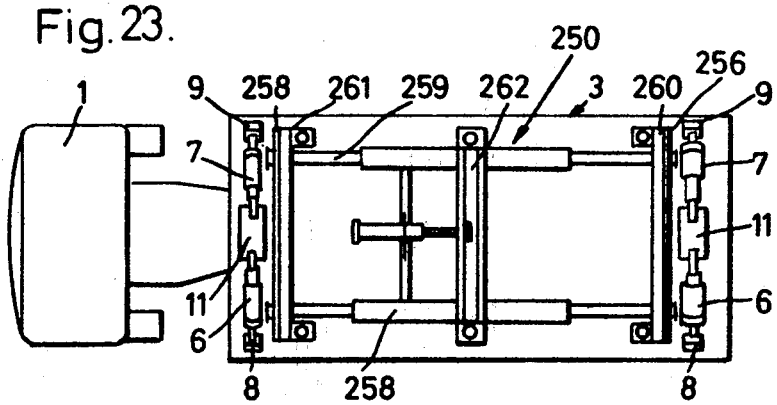

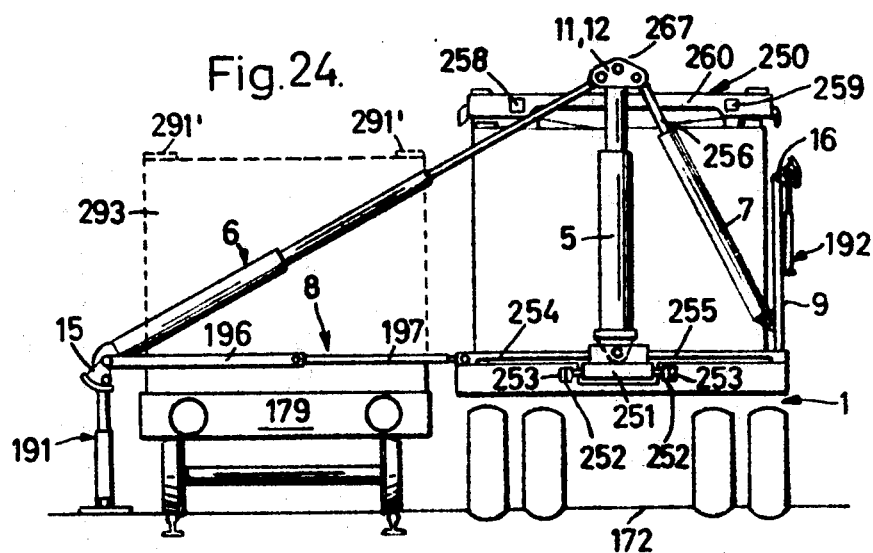
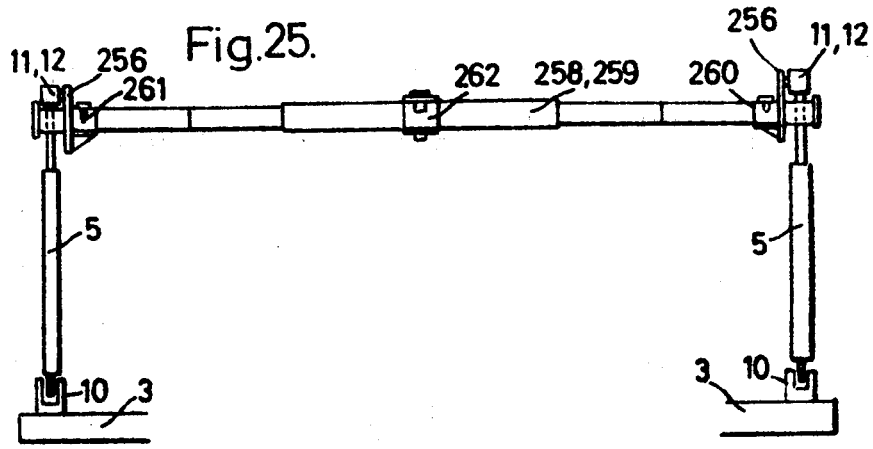

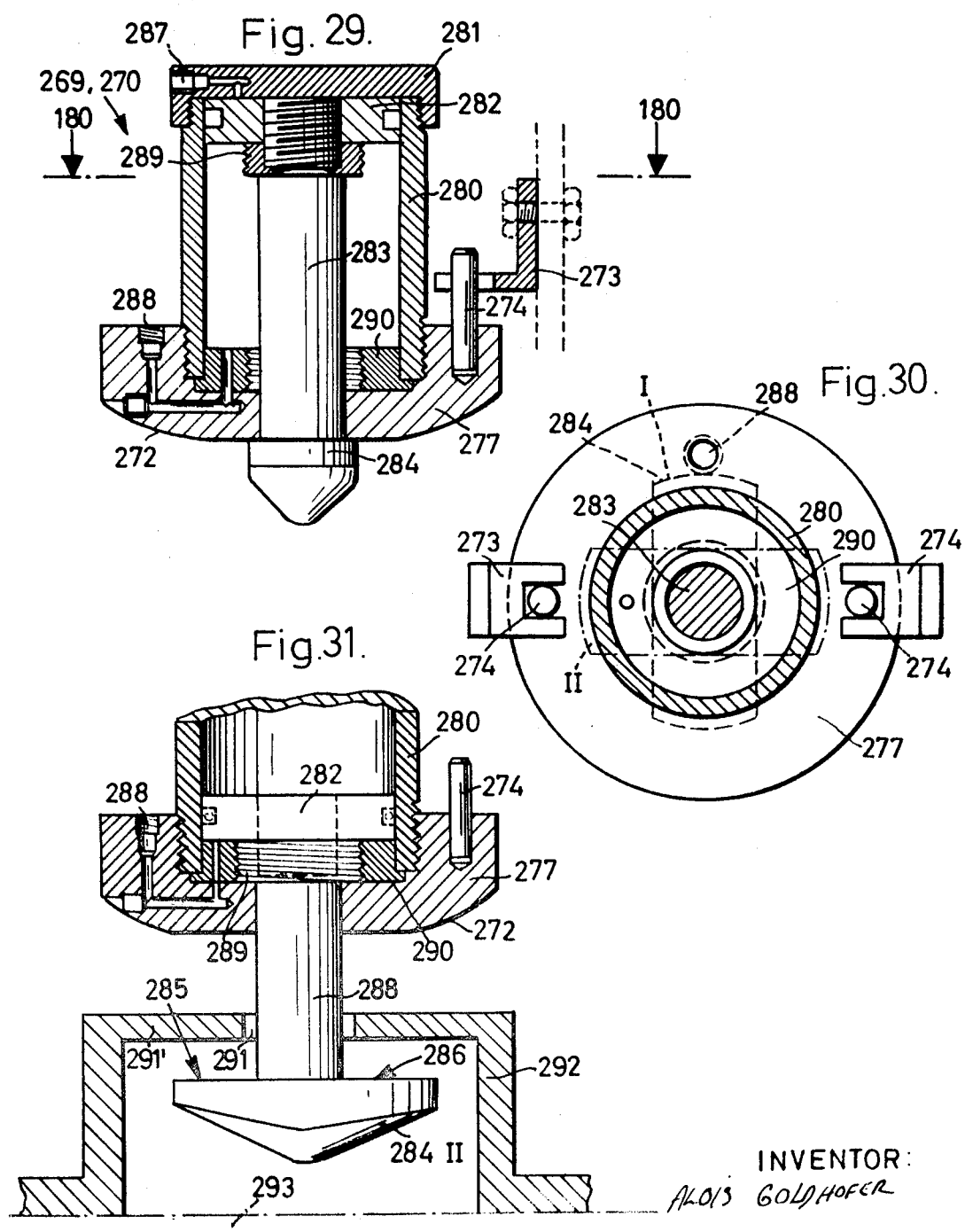

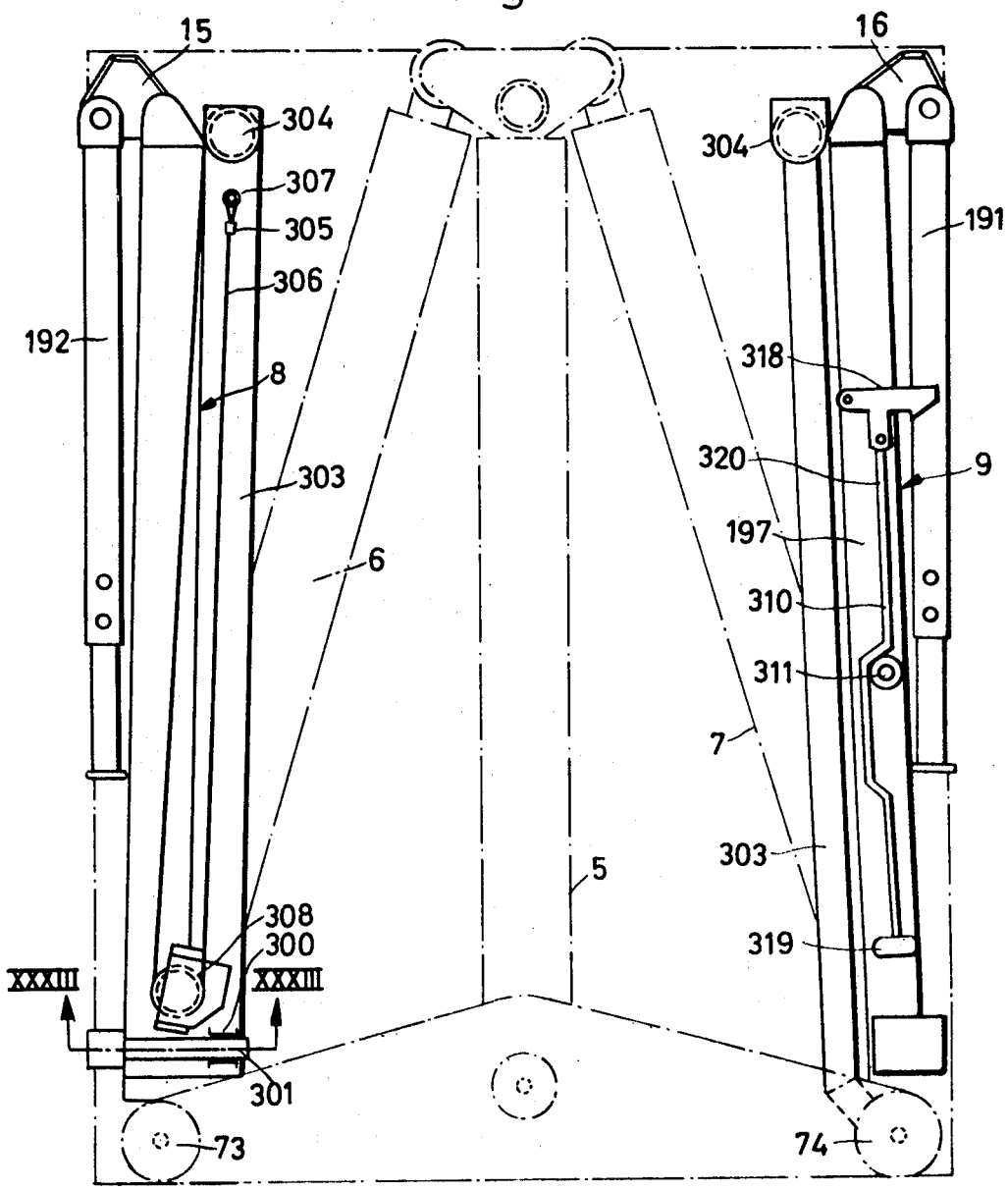

United States Patent Office
3,606,044
Patented Sept. 20, 1971

3,606,044
LOADING AND UNLOADING APPARATUS FOR BULKY LOADS
Alois Goldhofer, 397 Donaustrasse, D-8941 Amendingen, Memmingen, Germany
Filed Apr. 14, 1969, Ser. No. 815,843
Claims priority, application Germany, Apr. 13, 1968, P 17 55 215.7; Apr. 27, 1968, P 17 55 332.1
Int. Cl. B60p 1/48; B66c 23/62
U.S. Cl. 214—77R
11 Claims

ABSTRACT OF THE DISCLOSURE

A loading and unloading mechanism for bulky loads wherein the loading and unloading can be carried out at either side of the transporter, there being extendable support tubes for a frame assembly having a plurality of load holding implements.

---

The present invention relates to a loading and unloading mechanism for bulky loads and has for its object to provide an easier and more convenient method of loading and unloading bulky loads, containers, pallets or flats. The arrangement can be universally adapted to cope with loads of different sizes and shapes placing these loads at different levels and different places, and it is possible to pick up loads which are not exactly parallel to the longitudinal axis of the vehicle. Loading and unloading can be carried out at either side of the transporter and the apparatus could be mounted on the ends of the loading surfaces of vehicles, trailers or railway wagons.

According to this invention a loading and unloading apparatus for bulky loads in particular, containers, pallets or flats with piece goods and such-like comprises extendable support tubes mounted on the ends of loading surfaces of vehicles, trailers or railway wagons, the support tubes can be movable longitudinally, can swing sideways and are extendable by hydraulic, pneumatic or mechanical power, the tube ends have grabs attached by joints and a carrying device is connected to the heads of the support tubes by bearing pins which can turn and move in all directions against stabilising spring pressure in a bearing tube which is fitted to the head of a support pipe.

Preferably the bearing pin is axially movable in the bearing tube for a given distance.

Another preferred feature is the bearing of each bearing pin comprises a hemispherical ring with spherical outer surface and cylindrical inner surface which can move axially on a cylindrical extension of the bearing pin and an outer ring that has a spherical inner surface and a cylindrical outer surface which is fastened to the bearing tube.

In another preferred feature the bearing pin is provided at a certain axial spacing from a mid-point of the support with two support bolts which can move against outwardly directed radial spring pressure against each other, they are supported on the inner surface of the bearing tube parallel to the carry and hang device of the bearing pin.

Yet another preferred feature is that the support bolts are arranged to go through the end piece of the bearing pin which is in the bearing tube.

A loading and unloading device in accordance with the invention will now be described by way of example only, with reference to the accompanying drawings in which:

FIG. 1 is a side view of the trailer of an articulated lorry,

FIG. 2 is a plan view of a loading bridge fitted to the trailer,

Figure 4:
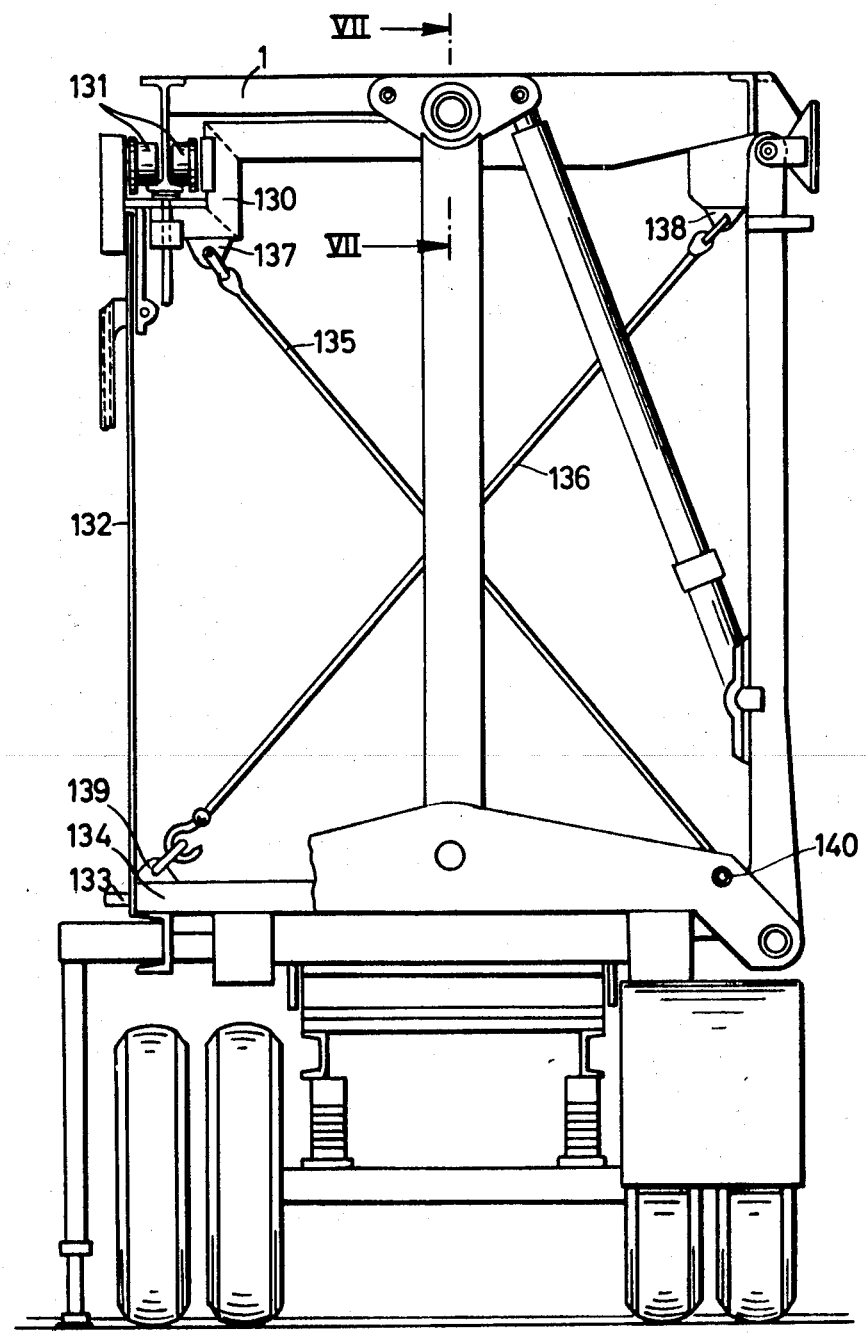
Figure 5:
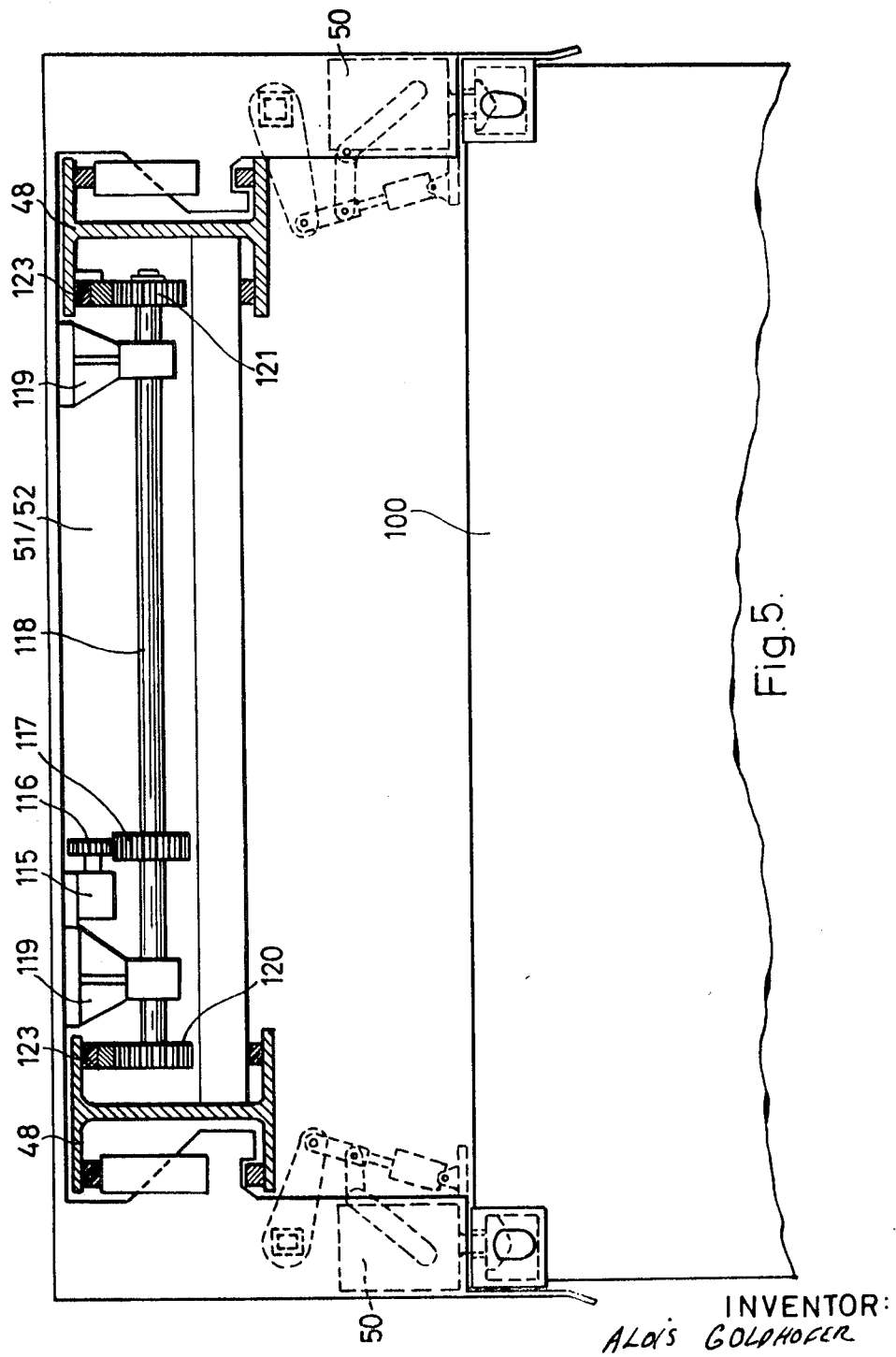
Figure 18:
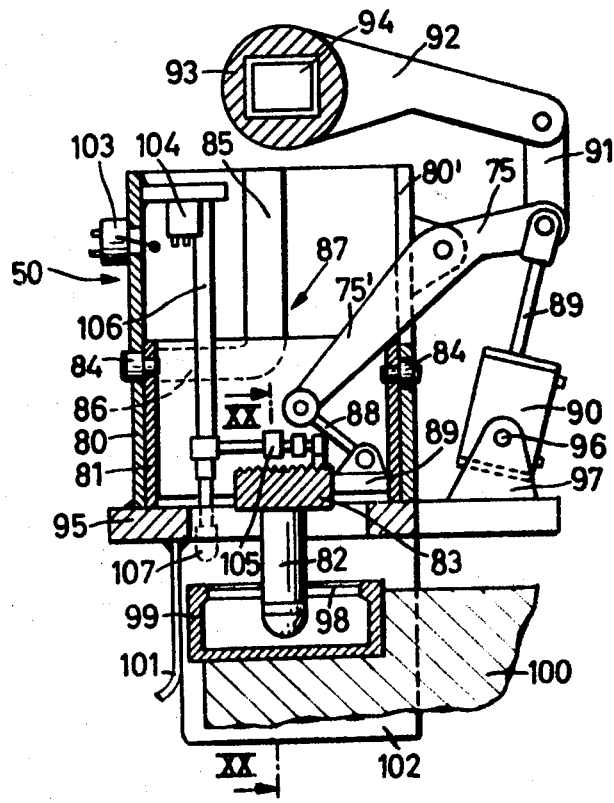
Figure 19:
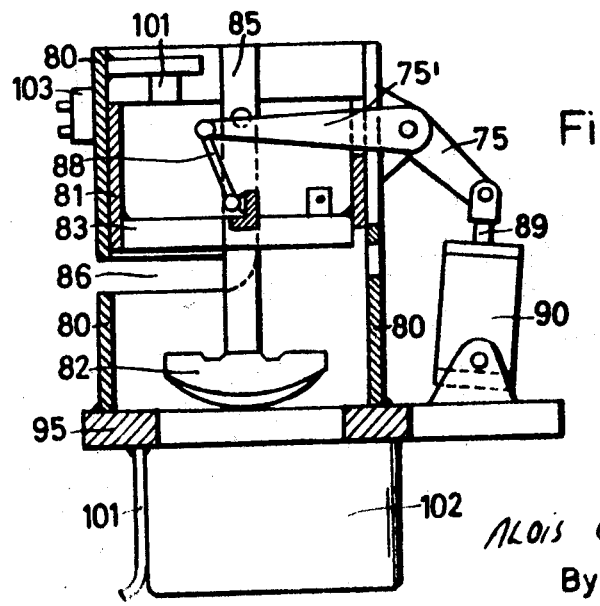
Figure 26:
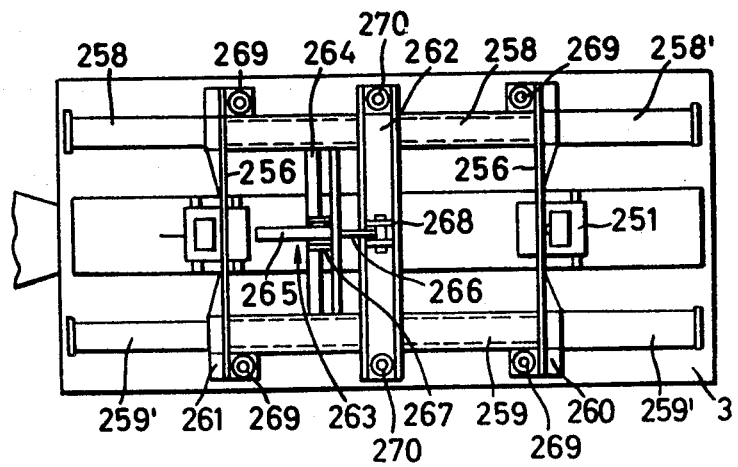
Figure 27:
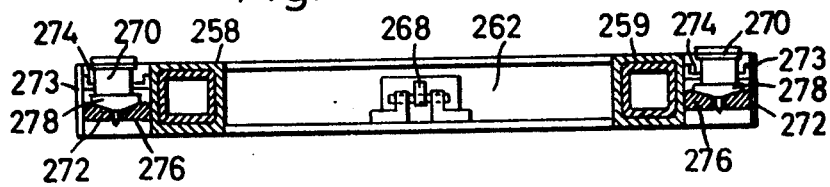
Figure 28:
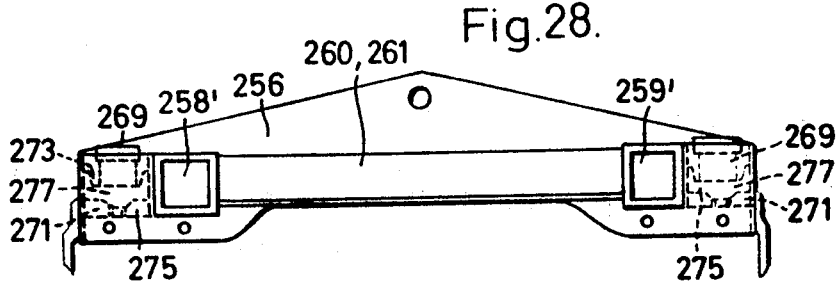
Figure 33:
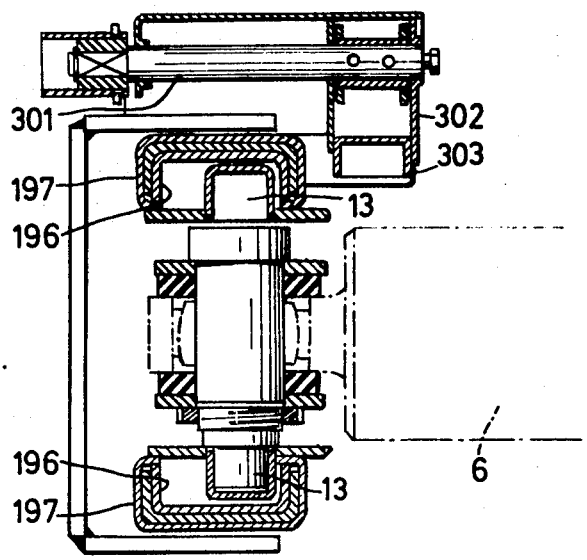
Figure 34:
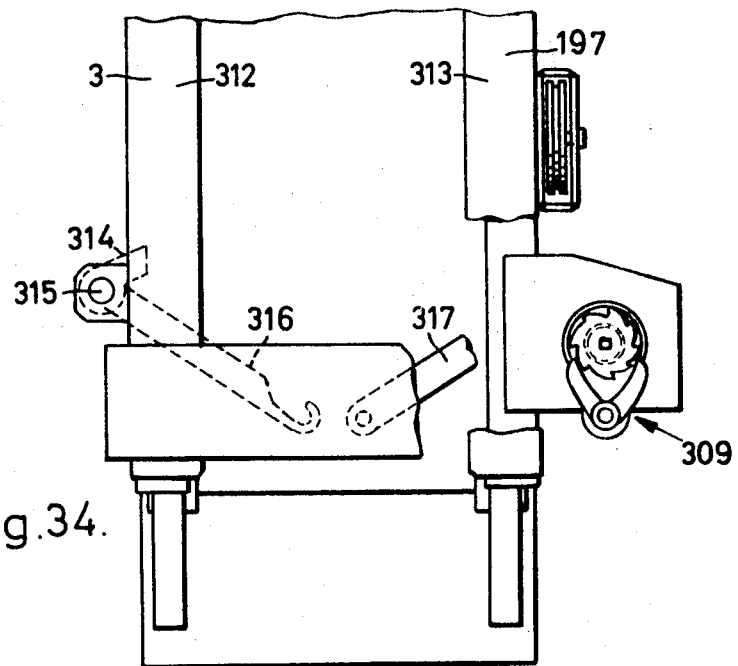

FIG. 3 is a side view of a lorry with a loading and unloading device, the bridge of which is provided with special carrying parts, FIG. 4 is a rear view of FIG. 3, FIG. 5 is a section along the line V—V of FIG. 1, FIGS. 6a, 6b and 6c are section views along the line VI—VI of FIG. 7, showing three different positions of the end piece of a trunnion, FIG. 7 is a section along the line VII—VII of FIG. 4, FIG. 8 is a schematic representation of the method of operation of the parts shown in FIG. 7 of which the hanging arrangements consist of a bridge, FIGS. 9 and 9a are schematic representations of different functioning positions of the trunnions of FIG. 7 when these are provided with carrying beams to which ropes and safety pins for the picking up of loads are attached, FIG. 10 is a section along the line X—X of FIG. 2, FIGS. 11 and 11a are different arrangements of the retaining and holding of a cross beam in a section along the line X—X of FIG. 2, FIG. 11b is a section through FIG. 11a along the line XIb—XIb, FIG. 11c is a section along the line XIc—XIc of FIG. 1, FIG. 12 is a rear view of a vehicle with another arrangement of the loading and unloading device in the rest position, FIG. 13 is a working position of the device relative to FIG. 12, with lifted container as load, FIG. 14 is an extension of a support rail in the middle of a swung-out arrangement, FIG. 15 is an arrangement relative to FIG. 4 in working position, FIG. 16 shows the position of the loading and unloading device during unloading of a container on to the ground, FIG. 17 shows the design of the folding support attached to the end of the support rail, FIG. 18 is a cross section through a design of a grab in working position, FIG. 19 is a section through the grab arrangement of FIG. 18 in the rest position, FIG. 20 is a section along the line XX—XX of FIG. 18, FIGS. 21 and 21a show two schematic switch diagrams of the limit switches of the grabs shown in FIG. 18, FIG. 22 is a lorry in side view with further design of the loading and unloading device, FIG. 23 is a plan view of FIG. 22, FIG. 24 is a rear view of FIG. 22 at start of operation during unloading of a container, FIG. 25 is a side view of a telescopically extendable bidge at its greatest length, FIG. 26 is a plan view of the bridge at its least length, FIG. 27 is a cross section through the central cross beam of bridge in FIG. 26, FIG. 28 is a cross section through the outer cross beam of the bridge shown in FIG. 26, FIG. 29 is a cross section through another design of a grab, FIG. 30 is a plan view of FIG. 29, FIG. 31 shows parts of FIG. 29 in another operating position, FIG. 32 is a rear view of a loading and unloading device whose support rails are moved telescopically by rope winches, FIG. 33 is a section XXXIII—XXXIII through FIG. 32, and FIG. 34 is a left side view of the lower part of FIG. 32.

In FIG. 1 is shown a lorry in the form of an articulated trailer which shows a bogey 2 and 2', as well as a loading surface 3. At the rear and front end region of the loading surface 3 looking in the direction of movement of the vehicle is attached a hydraulically-operated lifting device 4 and 4'. Both lifting devices 4 and 4' are identically built and consist of a telescopically extendable support tube 5 attached to the central axis of loading surface 3 (FIGS. 12, 13.) There are two pneumatic, hydraulic or mechanically operating telescopic supports 6 and 7, as well as two support rails 8 and 9. Every support tube 5 bears its lower end on the loading surface through a joint 10 that can swing across the longitudinal axis of the vehicle. It consists of several parts 5a, 5b, 5c, which fit into each other telescopically, but cannot rotate relative to each other. At the free end of the extendable part 5c is mounted a pin-pointed head part 11 for the attachment of carrier ropes and stop supports for picking up the load.

This head has a fish-plate 12 to which the telescopic supports 6 and 7 are connected through pivots. The telescopic supports 6 and 7 carry on their ends pivotally connected guide rollers 13 and 14 (FIG. 33) which bear in the support rails 8 and 9 so that they can be moved longitudinally in these.

The support rails 8 and 9 are movable through pin joints 173 and 174 which fit to the side edges of the loading surface 3, and have at their free ends pin joints connected to supporting shoes 15 and 16 (FIGS. 12 and 13).

To lock the support rails 8 and 9 in their vertical rest position the simplest design is insertable bolts 17. For the acceptance of trunnions 18 the head 11 as shown in FIGS. 6 and 7 is provided with a bearing tube 19. The bearing of the trunnion 18 in the bearing tube 19 consists of a hemispherical ring 20 with a spherical outer surface 21 and a cylindrical inner surface 22 which is axially movable on a cylindrical attachment 23 to the trunnion 18, and from the outer ring 24 with spherical inner surface 25 and cylindrical outer surface 26 which is fastened in the bearing tube 19. The hemispherical ring 20 is movable in an axial direction by the amount b (see FIG. 7) on attachment 23 between the surface 27 and safety plate 28. Through the spherical bearing surfaces 21 and 25 the bearing parts 20 and 24, the trunnion 18 is movable not only about its own axis 18' but also about axis 19' of the bearing tube 19 to the amount of angle 20', swingable in all directions. This universal bearing of the trunnion 18 in the head 11 of both support tubes 5 makes it possible that both support tubes 5 can be unevenly extended if required—i.e. when the container is on the ground or on another vehicle from which the lifting device should pick the load up, and is not exactly parallel to the loading surface of the lorry to which the loading device is attached. A ring 19a is provided for positioning the outer ring 24 axially relative to the head 11.

Apart from this, the angular movability of the trunnion 18 as shown in FIGS. 9 and 9a gives the possibility of vertical movement and thereby the advantage of attachment of ropes 218 which are fastened to the carrier beams 215 of trunnions 18.

These carrier beams 215 possess safety pins 29 which engage with the corner fittings on the upper side of the containers 31 whilst the ropes 218 must be fastened to the corner fittings 30' on the underside of the containers 31. For the easy attachment of ropes 218 in corner fittings 30', it is advisable to lower the guide tubes 19 a bit further when the pins are already attached so that the ropes hang slack as shown in FIG. 9.

In FIG. 9a the vertical position of the trunnions 18 is shown which they take up when container 31 is lifted and ropes 218 are tensioned.

In order to assure that the respective trunnions 18 may be stabilized in the position in which their axis 18' coincides with axis 19' of bearing tube 19, in spite of the swingable bearing at a certain axial distance from mid-point 32 of the bearing of the trunnion, there are two support pins 33 and 34 (FIGS. 6a, 6b, 6c) spring-loaded in opposition, which pins bear on the inner surface 35 of support tube 19. These supoprt pins 33 and 34 bear on the end pieces 37 connected to cylindrical attachment 25 of the trunnion 18 by four screws 37a by means of a through hole 36, and between their heads 33' and 34' and flat surfaces 38 and 39 of the end piece 37, several disc springs 40 are fitted which produce a radially outward spring pressure. The axis of the radial pressure through hole 36 runs parallel to carrier beam 215 respective to a bridge 41 (FIGS. 1 and 2), so that whilst the carrier beam 215 of bridge 41 is generally kept level, the stabilizing force of disc springs 40 also operates in the level in which the carrier beams 215 of bridge 41 find themselves. The stabilizing effect of support pins 33 and 34 is above all important when we are concerned with a telescopically extendable bridge 41' as shown in FIG. 8. The support pins 33 and 34 and the disc springs 40 have the purpose of arranging that the trunnions on both ends of bridge 41' are on a common axis so that the telescopic extension and contracting of the bridge can take place without hindrance.

Figure 6B:
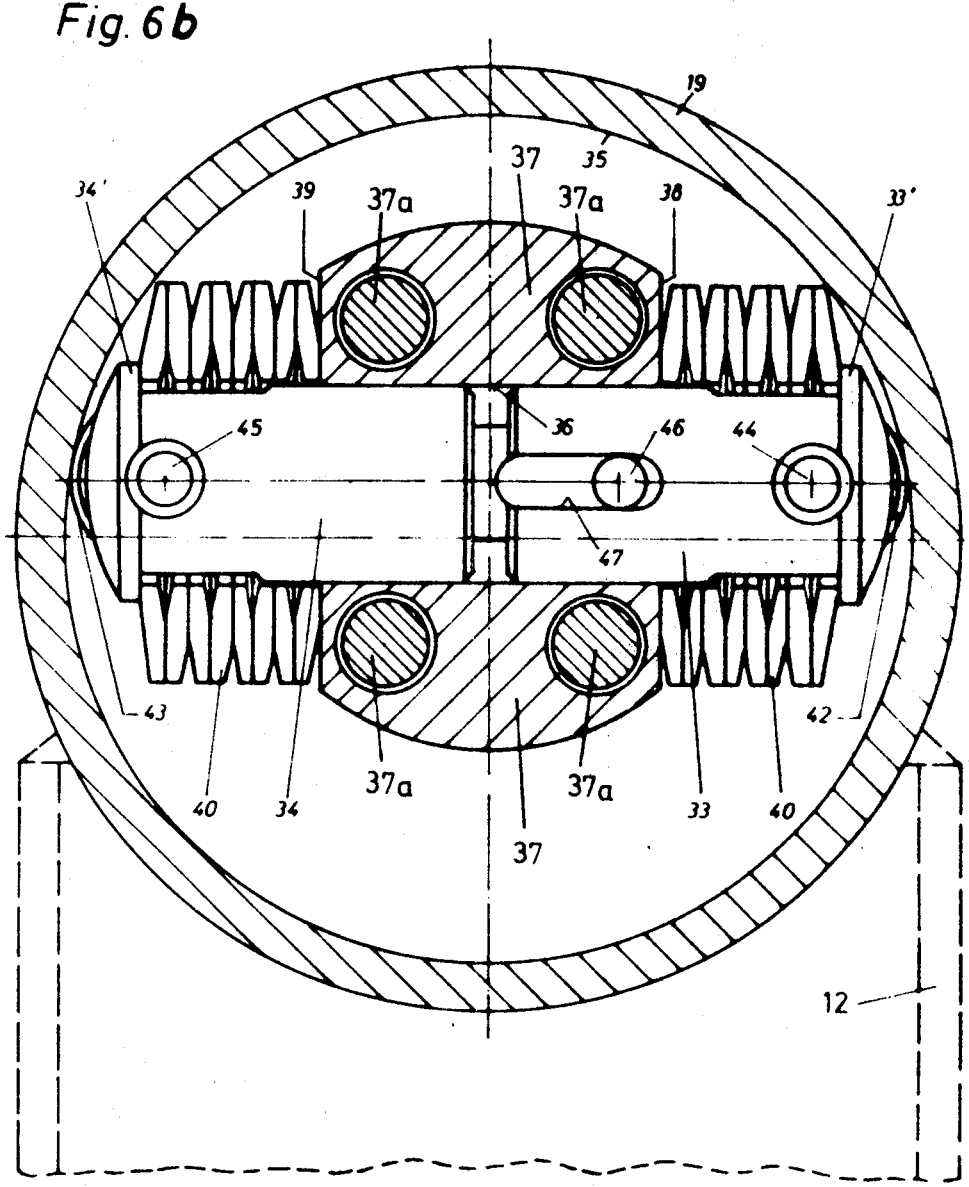
Figure 6C:
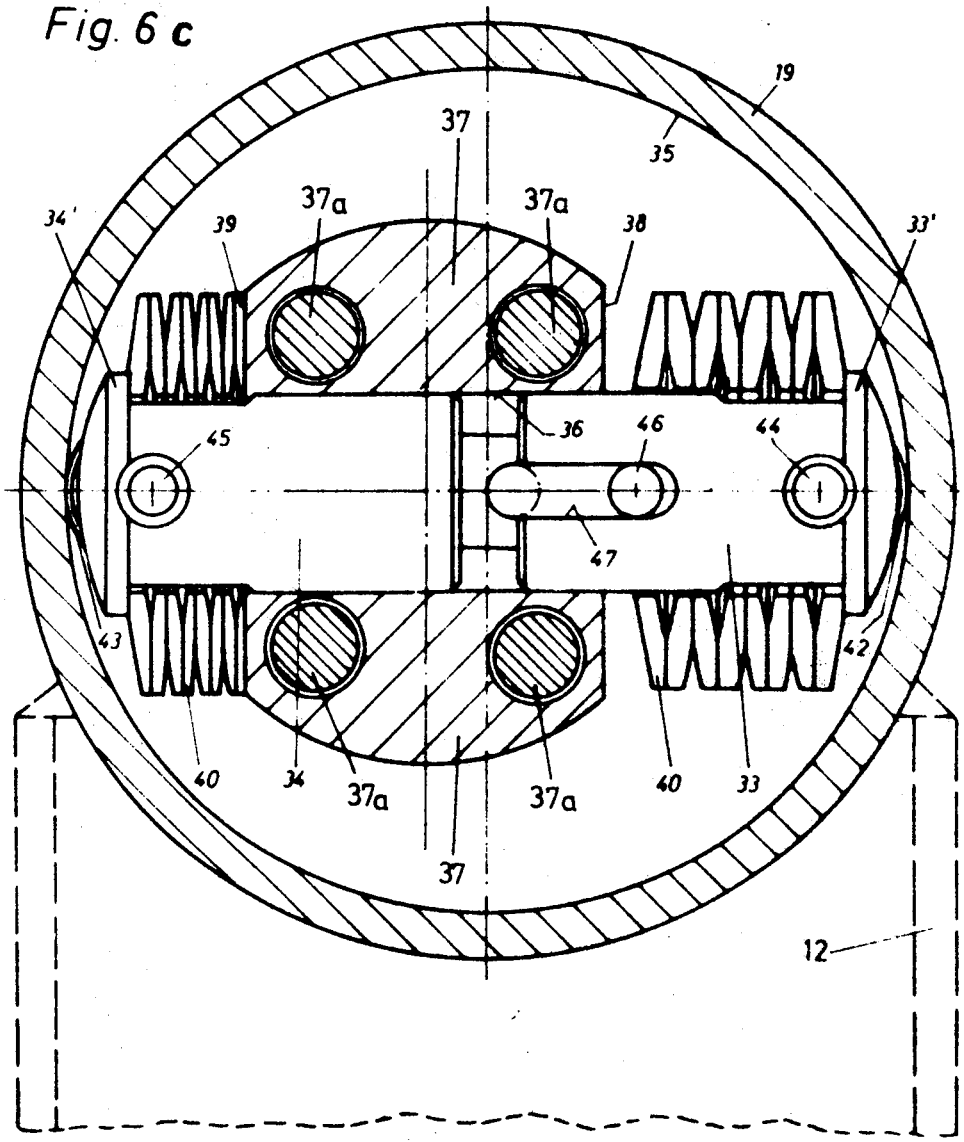

A swinging of trunnion 18 as shown in FIG. 9 is more easily possible because a vertical swinging of trunnion 18 about the bearing mid-point 32 produces only a very slight radial movement of support pins 33 and 34 as shown in FIG. 6b. In FIG. 6c the position of end piece 37 of trunnion 18 is shown being swung anti-clockwise in a horizontal plane, so that the disc springs of the support pin 34 carry a load.

So as to achieve a minimum frictional resistance between support pins 33 and 34 and inner wall 35 of bearing tube 19, the heads 33' and 34' of the support pins 33 and 34 are provided with support rollers 42 and 43 which can rotate on bearing pins 44 and 45.

A turning of support pins 33 and 34 on their own axis is prevented through pins 46 which are guided through guide member 47. Pins 46 are shown in two positions, one of them in dashed lines.

In the design example shown in FIGS. 1, 2, 3, 4, 5 and 7, the trunnions 18 of the forward and rear support tube 5 carry in common a bridge 41 which consists of a rigid rectangular frame built up from two parallel longitudinal beams 48, and two cross beams 49 which bridge over the loading surface 3. On this bridge 41 several grabs 50 are arranged in pairs which are connected through cross beams 51 and 52 and which can be moved longitudinally (arrow 53) along bridge 41.

The beams 51 and 52 are movable on the longitudinal beams 48 by means of trolleys 54 and 55. The longitudinal beams are, as shown in FIGS. 4, 5, 10 and 11, rails which have an I-shaped cross section.

The trolleys 54 and 55 consist of carrying rollers 56 and 57 and guide rollers 58 and 59 (FIG. 11c). As the carrying rollers 56 and 57 have bearings on horizontal shafts 60 and 61 on which they rotate and run on the horizontal surface 62 of the I-section beam, the guide rollers 58 and 59 run on the vertical web of the rail. The carrying rollers 56 and 57, and also the guide rollers 58 and 59, are arranged in a certain spacing from each other so as to achieve the best guiding properties. The guide rollers 58 and 59 sit on vertical shafts 64 and 65 fixed in guide blocks 66 and 67. These guide blocks are welded to a vertical carrier plate 68 which is connected to cross beams 51 and 52. In this carrier plate 68 are also the horizontal shafts 60 and 61 of carrier rollers 56 and 57 arranged to rotate with help of bearings 69.

Between the carrier rollers 56 and 57 on the vertical carrier plate 68 two suport brackets 70 and 71 are fixed which extend over running surface 62 of the carrier rollers 56 and 57.

As can be seen particularly from FIG. 11b, the carrier rollers 56 and 57 sit on eccentrics 72 for the extension of cross beams 51 and 52, with grab 50 as shown dotted in FIG. 11b, position A, in which support brackets 70 and 71 are raised from running surface 72. To rotate the shafts 60 and 61 with eccentrics 72, lifting arms 73 and 74 are fixed to the shafts 60 and 61 which are connected by fish plates with actuating lever 75 to grab 50.

As soon as the lever arms 73 and 74 are turned in the direction of arrow 77, the eccentric 72, and with it the carrier rollers 56 and 57, through the pull of the vertical carrier plate 68, are swung up, so that the support brackets 70 and 71 come to bear on the running surface 72 of the longitudinal beam 48, and the total load taken up from the grab is transferred on a longitudinal beam 48. By this means an extension of the cross beam 50 is no longer possible.

As soon as lever arms 73 and 74 are again turned up by actuating lever 75 in the opposite direction to arrow 77, the eccentrics 72 are moved down so that the carrier rollers 56 and 57 again come to bear on the running surface 72, and the vertical carrier plate 68 is lifted opposite the guide beam 48. Thereby the support plates 70 and 71 are lifted from the running surface 62 so that cross beams 51 and 52 can be easily displaced again. The carrier rollers 56 and 57 then carry the same loading as cross beams 51 and 52 with their grips 50.

Here follows a description of the design and method of functioning of grips 50. Particular attention is drawn to FIGS. 18, 19 and 20, also FIGS. 5, 11a and 11c. Gripping device 50 consists essentially of a tubular guide cylinder 80 and a lifting cylinder 81 which can be moved and turned in it, a cross finger 82 which is fastened to the lower end of lifting cylinder 81 by means of a cross plate 83.

The upper end of the lifting cylinder 81 has two diametrically opposed guide rolls 84, which run in the link 87 formed of a horizontal part 86 and a vertical part 85, while the vertical part 85 of link 87 reaches from the upper rim of the guide cylinder 80 up to half its height. The vertical part 86 of link 87 makes an angle of approximately 90°.

Through actuating lever 75 (see also FIG. 11a) whose long lever arm 75 is connected to the cross beam 83 with a side arm 89 through a ball joint connection 88, is acted upon by the up and down movement of lift cylinder 81, as also their rotary movement in the vertical part 86 of link 87.

The actuating lever 75 is connected to hydraulic cylinder 90 by means of a piston rod 89 and opposite fish plate 91 with a lever arm 92 which is fastened to bush 93. The bush 93 has a rectangular central opening and is attached to vertical carrier plate 68 (FIGS. 11a and 11c) which is not shown, safeguarded rotatably and against axial movement and from a square steering shaft 94.

The guide cylinder 80 sits firmly on a plate 95 which is horizontally fastened on to a vertical carrier plate 68, on which also hydraulic cylinder 90, by means of pivot pin 96, can swing on trunnion 97. Whilst in FIG. 18, the cross finger 82 of the grab 50 enters the grip fitting 99 on container 100 through narrow slot 98, and opposite slit 98 already turned through 90°, it is shown in FIG. 19 in its rest position.

So that the cross finger 82 can find its way into the gripping fixture 50 on container 100 the underside of plate 95 has two vertical guide plates 101 and 102 at right angles to each other, of which one is longer than the other.

In the grab 50 there are three identical but differently-functioning limit switches 103, 104 and 105. Limit switch 103 closes when lift cylinder 81, and with it cross beam 82, takes up its rest position (FIG. 19). The limit switch 104 closes when a stop 107, adjustably attached to a pipe 106, contacts the grip attachment of container 100, and thereby signals that the grab has been lowered sufficiently for grab finger 82 to enter into grip fixture 99 of container 100. Limit switch 105 is fastened to guide tube 106 so as to be rigidly connected with guide cylinder 80, and is fitted outside the area of cross plate 83, and closes when grab finger 82 assumes its working position —i.e. when it is in the slit 98 of grip fixture 99 and has turned through 90° as shown in FIG. 20.

With the help of these limit switches it can be signalled exactly if the grip fittings are in the rest or working position. Further, the limit switches as shown in FIGS. 21 and 21a can be used for controlling the hydraulic cylinder 90—i.e. the hydraulics of the lifting device.

In FIG. 21 the limit switch 104 and the four grabs 50 are switched in series to control a switch piece 108 whose switch contact 109 actuates two electro-magnetic valves 110 and 111, which in turn control the pressure inlet of hydraulic cylinder 90 of individual grabs 50.

Instead of the switch protection 108, a control lamp could, of course, be switched into the circuit of the limit switch 104 which indicates when all four grabs which are necessary for lifting a container are in their correct position on the container.

The switch arrangement shown in FIG. 21 does not only permit these positions to be indicated, but at the same time prevents that hydraulic cylinders 90 being actuated without grabs 50 having been brought into their proper positions. This is by connecting up as well as disconnecting the grip fixtures 99 by which plate 95 must be lowered so far that stop 107 lies on the upper side of grip fixture 99 so that cross finger 92 when it has entered grip fixture 99 is free to turn.

In FIG. 21a is shown a possibility for the control of the hydraulic lifting device by means of limit switches 103 and 105. Here the limit switch 103, which indicates the rest position of the grab finger 82, is switched on in turn and parallel to the series connected limit switch 105, whose four grabs indicate the working position of grab finger 82. Limit switch 103 on one side and 105 on the other side actuate a switch protection 112 whose switch 113 controls the opening and closing of the electro-magnetic valves 114 which control the lifting hydraulics.

By this means it can be achieved that the lifting grab 50 of bridge 41 is only permitted when either all four grabs are in the rest position or working position.

The control shaft 94 which stretches along the whole bridge 41 has the purpose that not every grab 50 needs to have a hydraulic cylinder 90 for its operation. The hydraulic cylinder 90 of one grab actuates at the same time another grab on the same side of bridge 41 through lever arm 92 and control shaft 94.

The connection mentioned with FIGS. 11a, 11b and 11c between actuating lever 75 and lever arms 73 and 74 ensures that the inserted cross fingers 82 in gripping attachment 50 lift carrier rollers 56 and 57 from running surface 62.

As shown in FIG. 5, the vertical carrier plate 68 can be extended downwards so that the grab arrangement 50 sits under bridge 41. This has the advantage that also containers with reduced height can be picked up by the grab when at the same time one or more containers with greater height are on loading surface 3 or on the ground which make a further lowering of bridge 41 impossible.

In FIG. 5 is shown at the same time the drive arrangement for moving longitudinally the cross beams 51 and 52 through power drive. A hydraulic motor 115 drives through pinion 116 and gear wheel 117 and shaft 118, which is able to rotate in bearings 119. Bearings 119 are fastened to cross beams 51 and 52. Through gear wheels 120 and 121 shaft 118 is engaged with racks 122 and 123 which is fastened to longitudinal beam 48. Through rotation of the pinion 116 by hydraulic motor 115 in one direction or the other, a longitudinal motion one way or the other of cross beams 51 and 52 is produced.

Another design of this motion drive of cross beams 51 and 52 is shown schematically in FIG. 10. There a hydraulic motor 124 is fastened to the cross piece 49 of bridge 41, and on this shaft 125 is a chain wheel 126 which is in connection with a chain which is not shown. The chain is fastened at both ends on one of cross beams 51 or 52 as well as over chain wheel 126 which sits firmly on shaft 125, as well as over a second freely-rotating chain wheel fixed to the cross piece 49 opposite. Exactly the same arrangement is made for the second cross beam.

As soon as hydraulic motor 124 turns in one direction or the other, the chains on chain wheel 126 move longitudinally and pull with them cross beam 51 or 52 along bridge 41.

Instead of fitting bridge 41 with grab 50, cross beams 51 and 52, the designs in FIGS. 3 and 4 show guides 130 with carrier rolls 131 provided with carrier posts 132, which connect with coupling bolts 133 on flats or pallets 134.

To stabilise the load diagonally cross-wise, safety ropes 135 and 136 are attached with eyes 137, 138, 139, which are fastened to the guides 130 on the flats or pallets 134. Preferentially, three such carrier posts are arranged on each side of bridge 41, from which however only two are required. One requires when three are available that the individual carrier posts need not be pushed so far on their guides over bridge 41.

It is of advantage that when the carrier posts 142 as shown on the left side of FIG. 3, the unused carrier post 132 can be swung upwards.

A further design of the invention regarding FIGS. 12 to 16 and 22 is the support rails 8 and 9 provided at the free ends with supporting shoes 15 and 16, with folding supports 191 and 192 connected by joints with support shoes 15 and 16.

The folding supports 191 and 192 are telescopically extendable and consist of two parts 193 and 194 which can be locked together through stops 195 against axial movement.

Also the support rails 8 and 9 consist of two parts, an outer part 196 and an inner part 197.

When the folding supports 191 and 192 on the support rails are provided only with simple stops 195, it is not possible to alter the overall length of the swung-out and loaded support rail 8 or 9. Therefore it is advisable to provide the folding supports 191 and 192 with a height adjustment, with the help of which the overall length of the folding supports may be altered under load.

In FIG. 17 is a design of such a folding support 191, 192. As already mentioned, the folding support 191, 192 consists of two parts 193 and 194, which telescope inside each other. Part 193 of folding support 191, 192 is connected through a joint 198 with supporting shoe 16.

The upper limit of part 194 bears a rope winch 199 so that it may be turned by a handle 200. The lower in part 194 bearing end of part 193 is equipped with a rope coil 201 which can turn with pin 202 connected to part 193. Pin 202 is in a longitudinal direction of folding support 191, 192 in a guide slit 203 which serves to limit the movement between parts 193, 194. A tensile rope 205 is attached to bolt 204 on part 194 on the outside of winch 199 which leads over rope roller 201 and is led on the other side to the top of winch 199 to which its other end is fastened. Through turning the handle 200 clockwise (see FIG. 17) the folding support can be extended in that roller 201 on pin 202 is pulled up by the winding of rope 205 on winch 209. The winch is provided with a ratchet so that self actuation of handle 200 and the winch is prevented and intentional rotation of the winch 199 releases this in one direction or the other. By this arrangement an extension or shortening of folding supports 191, 192 under load is possible—i.e. supporting rails 8 or 9 are already loaded through telescopic pieces 6 or 7.

To achieve a better support on ground 172, hinge supports are provided with jointed support shoes 206.

To limit the extension of support rails, outer part 196 opposite inner part 197, the inner part 197 is provided at its outer end with a stop bolt that springs downwards which is guided in a slit in the outer part 196 of the support rail.

It is of advantage if the stop bolts can be inserted in different positions so that the different extension of the support rails 8 or 9 can be arranged.

FIG. 15 shows a container 176 placed on wagon 179. The folded support rail 8, whose outer part 196 is extended, supports itself by means of folding support 191 out on the ground 172. The length of folding support 191 is so arranged that the support rail 8 lies horizontally, and support rail 8 is extended so far that folding support 191 extends to the ground 172 at the side of the wagon 179.

To extend the support rail 8 or 9 to its full length it is of particular advantage that the outer part of support rail 196 is extended while it swings out until contact with stop 207 extends folding support 191 on its own outside the wagon on to the ground. Such an arrangement is of particularly great advantage when loads must be transferred from one lorry to another or on to a wagon, as the directing of the support rails 8 or 9 and their folding supports 191, 192 manually is very difficult or impossible by a person from the ground. In FIGS. 14 and 15 such a design for self-actuating extension of support rails 8 and 9 is shown in different working positions.

At its free end the guide 208 is provided with at least one guide groove 212 which is limited by a web 213 and is open at the end of guide 208. At the inner end of the support rail outer part 196 is firmly attached, at least on one side, to a sideways springing-out guide bolt 214, which during a certain swinging range of support rail 8 and in the vertical rest position of support rail 8 runs in the guide groove 212.

On the right side of support tube 5 in FIGS. 14 and 15, the rest position of guide 208 and arm 209 and 210 are shown.

When the support rail 8 is lowered further to that position shown in FIG. 14, the guide bolt 214 leaves the groove 212 of the guide 208, and the guidance of support rail 8 is then taken over during swinging downward by the telescopic support 6. As soon as support rails 8 reach the position shown in FIG. 15, the end of telescopic support 6 glides on its glide rollers outwards to the end of support rails outer part 196 and, of course, a stop can be provided on rail 8 so that the outer end of the telescopic piece is not pushed right out.

As soon as load 176 is shifted and the parts of the loading and unloading device have been brought back to their rest position as in FIG. 12, the support rail 8 is swung up through the telescoping pieces 6 so that guide bolts 214 again enter guide grooves and guide 208. This occurs approximately in position of FIG. 14. As soon as guide bolt 214 is in groove 212, further in swinging of the support rail 8 in the vertical rest position of the support rail outer part 196 is forced downwards through guide 208. During the upper swing movement of support rail 8 the lower part of telescopic piece 6 glides inwards into the position shown in FIG. 14 so that at the end of the retrieval when the guide rails 8 have reached the vertical rest position, they are again contracted to their normal length as in FIG. 12.

The guide arrangements just described in FIGS. 14 and 15 for the in and out movement of support rails can be provided by hydraulic cylinders 141, 142 as shown in FIGS. 12 and 13. Thereby the outer parts of support rail 197 are connected with push rods 143, 144 of cylinders 141 and 143 whilst the cylinders 141, 142 are themselves connected with the inner part 196 of support rails 8, 9. By this means the extending of support rails occurs through hydraulic force and makes remote control possible.

A further possibility of the in and out movement of support rails 8 and 9 is shown in FIGS. 32, 33 and 34. FIG. 32 shows both rails 8 and 9 in the vertical rest position. On the support inner part 196 a rope winch 300 fastened on shaft 301 in bearings 302 can be turned in either direction by a handle not shown.

At the end of the long support rod 303 connected with support rail inner part 196, and of the same length as this, a coil of rope 304 is fitted so as to be able to rotate, and one end 305 of rope 306 is attached to a pin 307. The other end of the rope 306 is firmly connected with winch 300 so that it is wound up on the winch. Rope 306 is led over roller 104 on support rod 303 and a second roller 308 which are fixed so as to rotate on the inner end of the outer part of support rail 197. Through this rope arrangement, with the help of winch 300, support rails 8 and 9 can be extended. For this the rails are swung out of the vertical near to the horizontal so that minimum effort is required.

As can be seen in FIG. 34, shaft 301 of winch 300 can be equipped with a ratchet to prevent undesired movement of outer part of 197.

On outer part 197 a stop pin 311 is fixed to a load spring 310 which can enter the stop opening of inner part 196 not shown in the drawing, when the outer part 197 is extended through the rope.

Another arrangement is seen in FIG. 34 where on the support rail outer part two parallel support rail arms 312 and 313, stop dogs 314 with a shaft 315 arranged to swing and through lever arms 316 and 317 which can be engaged together, held out of engagement with support rail inner part 196. The stop dogs 314 are under the influence of springs which bring them into engagement with the appropriate stop holds of support rail inner part 196.

In FIG. 32 the right side, is shown a swingable fixed stop latch 318 which retains folding support 191, and is provided with handle 319, pull rod 320 to release folding support 191.

In the following further design of the device relative to FIGS. 22 to 31 is described with which it is also possible to grip loads of different lengths, to lift them, to swing them out and to shift them. This arrangement also makes it possible for several short loads such as containers to load on to surface 3 of the lorry one after the other without moving the vehicle itself longitudinally.

A grab is described which engages itself in the grip attachments of the load and releases so that this need no longer be done manually, which is safer for the personnel.

In the design of FIG. 24, support pipe 5 is not firmly connected through joints with loading surface 3, but is fixed on a bracket 251 which can be moved by means of rollers 252 along the loading surface on rails 253.

The support rails 8 and 9 can swing with the support pipes 5 and their connected arms 254 and 255. The arms 254 and 255 lie above load surface 3 and can move together with the support pipes and brackets 251 along the vehicle.

On the fish plates 12 on the free ends of support pipes 5 are carrier arms 256 swingably mounted on pivot pins 257. The carrier arm 256 has bridge 250 connecting the free ends of support pipes 5 which over-bridges the complete length of load surface 3.

The bridge 250 consists of two longitudinal beams 258 and 259 shown in FIGS. 25 and 26, symmetrically arranged to the pivot bolts 257, and running parallel to the length of the vehicle. They are telescopic so that the longitudinal separation of both support pipes 5 can be altered. The attachment of both longitudinal beams 258 and 259, which together with carrier arms 256 both head ends 11, form bridge 250, are arranged with three cross beams 260, 261, 262, from which cross beams 260 and 261 in the example are connected with carrier arms 256 and 257, so that their positions longitudinally to load surface 3 are altered together with support pipes. The cross beams 262 can be moved for about half the distance between the other cross-beams 260 and 261 on the longitudinal beams 253 and 259, and are under the influence of a pushing device 263 which is fastened to a cross spur 264 of the bridge 250. The pushing device 263 consists of a hydraulic cylinder 265 and piston rod 266. The hydraulic cylinder 265 is connected with hinge support 267 with cross spur 264, and the piston rod 266 through a joint 268.

As can be seen in FIGS. 27 and 28, the cross beams 160, 161, 162 carry grabs 169, 170 outside the longitudinal beams 158, 159. The grabs 169, 170 are held in hemispherical rings 171, 172 and are guided sideways by guide clevis 173, and pin 174 which enter into each other loosely. The provision of the hemispherical rings 171, 172 as support for the grab 169, 170 is to provide a certain mobility so that it can move out of the vertical and can adjust to the lifting forces of the load. It is also possible to insert slightly elastic packing between support plate 175, 176, the cross beams 160, 161, 162 and the support part 177, 18 of grabs 169, 170 to give a certain mobility to the grab when these are not loaded exactly vertically.

As will be described with reference to FIGS. 29, 30, and 31, the grabs 169, 170 are so made that they may be remotely controlled to engage, lock and disengage the grab attachment of the load. Otherwise the arrangement of the grabs 169, 170 on cross beams 160, 161, 162 is such that their spacing exactly matches the transverse spacing of the grab fittings on containers. Through this, it is possible to achieve self acting connection of grabs 169, 170 with grab fittings of containers to be lifted which makes the handling quicker and easier. The arrangement of grabs 269, 270 as shown with their central axes vertical are provided to engage with the slots of the grab fittings on the corners of containers.

As shown in FIG. 29, such a grab 269, 270 consists of a hydraulic pressure cylinder 280 with a screwed-on head 181, a support part 17, a piston 182 and a piston rod 183 which moves axially in support piece 177 and has a mushroom-headed cross finger 184 at the end.

In FIG. 29 the mushroom-headed cross finger is shown in the narrow side view whereas in FIG. 31 shown broadside view, so that the cross pieces 185, 186 are visible. These cross fingers 184 are firmly connected with the piston rod 183 so that it can neither turn nor move axially relative to it.

The lower end of the cross finger 184 is radiused so as to enter the slot of the grab fixture more easily.

In FIG. 29 piston 182 and cross finger 184 on piston rod 183 are shown at rest. On the upper part of the piston rod 183 under the piston 182 is threaded part 189 with a multi-start, very rapid thread which acts with nut 190 in the lower part of the pressure cylinder 180 during the last part of the motion of the cross finger 184 and piston rod 183 so that the piston rod and cross finger 184 are turned about 90°.

In FIG. 30 both positions I and II of cross finger 184 are indicated by broken lines. Position I shows cross finger 284 in the rest position as FIG. 29 and by outward movement of piston rod 283 until thread 289 engages with the nut 290. During further movement of piston rod 283 downwards the cross finger 184 and the piston rod are rotated into position II (FIGS. 30 and 31).

The lift of the piston 182 and piston rod 183 is so chosen that the cross finger 184 with its cross pieces 185, 186 have entered the slot 191 of grab fixture 192 of the container, when the thread reaches the nut 190 and produces rotation through 90° of cross finger 184 as shown in FIGS. 30 and 31 position II.

Through the rotation of cross finger 184 into position II self releasing between grab 169, 170 and grab fitting 192 of the container is not possible. Thereby the danger of losing the load has been averted.

After the load has been set down, and the bridge 150 with crossbeam 160, 161, 162 is lowered by at least the height of screw thread 189 so that the cross pieces have a vertical clearance, the piston 182 is put under pressure from below so as to move upwards and rotate the cross finger into position I when it can leave the grab fittings 192 again and return to rest position, as FIG. 29.

It is assumed that there are two containers behind each other, with a certain separation which are to be loaded onto the vehicle. Through appropriate control of support tubes 5 and telescopic supports 6 and 7 booms 8 and 9 swing out and lower bridge 150 on top of the container. Through appropriate longitudinal movement of cross beams 160, 161 and central cross beam 162, grabs 169, 170 are directed exactly over the grab fittings of the containers and the cross fingers of the grabs are brought into engagement and locked in position II as described. Thereafter the device is so steered that the container hanging from the bridge 150 is lifted onto the vehicle.

After lowering the containers 193 onto load surface 3 of the vehicle, the bridge is then lowered a little more to the height of the thread 189 and the cross fingers can be turned again to position I and released from the slots 191 in grab fixtures 192.

When moving the cross beams 160, 161, 162 along the bridge 150 it is basically immaterial if the outer cross beams 160, 161 move together with or independent of support tubes 5.

For loading comparatively short but very heavy loads, it is of advantage to reduce the span of bridge 150 until the load only just has room between support tubes 5. It is then immaterial if both outer or an outer and the central cross beam are used to lift. To load or unload two containers standing behind each other on the loading surface, it is however, advisable in every case to use the central cross beam.

It has yet to be mentioned that through the described arrangement of the grab 169, 170, the cross beam 160, 161, 162 and the bridge 250, the extendable ends of support tubes 5 can be adjusted to a minimum height so as to lie directly on the top of the load. Also it is possible with very high loads for the bridge 250, which is connected to pivot with the support tube ends, to place itself vertically or diagonally, according to the form of the load beside the load so as not to increase its height.

As shown in FIG. 12 contact switches 233, 234 can be fixed on both sides of support tubes 5 to limit the side movement of the support tube 5. Contact switches 233, 234 can give a signal to switch off further movement. Instead of switches, stops could be provided. In the present invention at both ends of the loader there are supporting tubes 5 that can pivot in a line normal to the longitudinal axis of the loader and wherein the loading tubes are telescopic. In addition, the head ends of the support tubes are connected with a support beam. Further, in the pins 18 there is a stabilizing spring tension which acts on the suport beam or the support tubes so as to urge them into a position at right angles relative to each other.

I claim:

1. For use in combination with a loading surface of a vehicle or the like having the capability of holding or transporting a bulky load, a loading and unloading apparatus comprising a plurality of pivotally mounted extendable supporting tube assemblies; power means for causing pivotal movement of said supporting tube assemblies relative to said loading surface; beam means supported by and extendable between said extendable support tube assemblies for holding the load; and bearing means positioned between each of the support tube assemblies and said beam means for holding the load; said bearing means comprising a bearing member, means for enabling movement of said bearing member in a plurality of directions, and a stabilizing spring assembly tending to maintain a particular orientation between the supporting tube assembly and said beam means for holding the load.

2. The apparatus of claim 1 wherein the stabilizing spring assembly includes a support pin (33) and a spring means (40) biasing said support pin.

3. The apparatus of claim 2 wherein a second support pin and spring means is provided and wherein the spring means bias their respective support pins in opposition.

4. The apparatus of claim 3 wherein the bearing means includes a bearing tube (19) and the respective support pin and spring means associated therewith are radially disposed in opposition within said bearing tube.

5. The apparatus of claim 1 wherein the beam means for holding the load comprises a bridge means (41) and means connected to said bridge means for attaching to the load.

6. The apparatus of claim 5 wherein said means for attaching to the load includes means for allowing movement thereof along the bridge means for accommodating loads of different sizes.

7. The apparatus of claim 5 wherein said means for attaching to the load comprises an elongate cross finger member (82) and means for rotating said finger member into a retaining position, and wherein the load contains a receiver portion having a narrow slot therein for receiving said cross finger member.

8. The apparatus of claim 1 wherein the beam means comprises a first and second portion wherein said portions are telescopically adjustable relative to each other.

9. The apparatus of claim 8 wherein the pivotally mounted extendable supporting tube assemblies are telescopically extendable and wherein they are independently extendable such that the beam means supported thereby may assume any of a plurality of diverse orientations.

10. The apparatus of claim 1 wherein a pivotal plate (12) is carried by each supporting tube assembly and at least one additional extendable support (6, 7) is pivotally connected to said plate.

11. The apparatus of claim 10 wherein the additional extendable support is further connected to the loading surface (3) by means of a telescopic member.

References Cited

UNITED STATES PATENTS

| | | | |
|---|---|---|---|
| 2,567,178 | 9/1951 | Bird | 214—77 |
| 3,030,133 | 4/1962 | Rowlett | 287—88 |
| 3,233,759 | 2/1966 | Turturro et al. | 214—80 |
| 3,306,640 | 2/1967 | Melton et al. | 287—90(A) |
| 3,448,874 | 6/1969 | Martinson | 214—77X |
| 3,458,066 | 7/1969 | Klaus | 214—77 |
| 3,484,003 | 12/1969 | Strandberg et al. | 214—77 |
| 3,485,392 | 12/1969 | Lofgren | 214—77 |

FOREIGN PATENTS

| | | | |
|---|---|---|---|
| 920,670 | 1/1947 | France | 287—88 |
| 690,752 | 5/1940 | Germany | 287—88 |
| 909,470 | 10/1962 | Great Britain | 287—88 |

GERALD M. FORLENZA, Primary Examiner

R. J. SPAR, Assistant Examiner

U.S. Cl. X.R.

287—90B; 294—67DA, 67DB, 67DC